US008810995B2

(12) United States Patent
Zhou et al.

(10) Patent No.: US 8,810,995 B2

(45) **Date of Patent: *Aug. 19, 2014**

(54) CARBON NANOTUBE COMPOSITE, METHOD FOR MAKING THE SAME, AND ELECTROCHEMICAL CAPACITOR USING THE SAME

(75) Inventors: Rui-Feng Zhou, Beijing (CN); Chui-Zhou Meng, Beijing (CN); Kai Liu, Beijing (CN); Kai-Li Jiang, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., New Taipei (TW)

(*) Notice: Subject to any disclaimer, the term of this patent is extended or adjusted under 35 U.S.C. 154(b) by 591 days.

This patent is subject to a terminal disclaimer.

(21) Appl. No.: 12/826,963

(22) Filed: Jun. 30, 2010

(65) Prior Publication Data

US 2011/0096465 A1 Apr. 28, 2011

Related U.S. Application Data

(63) Continuation of application No. 12/822,308, filed on Jun. 24, 2010, now Pat. No. 8,246,860.

(51) Int. Cl.
*H01G 9/00* (2006.01)

(52) U.S. Cl.
USPC ............ 361/502; 361/503; 361/504; 361/512

(58) Field of Classification Search
USPC .................................. 361/502, 503, 504, 512
See application file for complete search history.

(56) References Cited

U.S. PATENT DOCUMENTS

| | | | | |
|---|---|---|---|---|
| 6,021,039 | A * | 2/2000 | Inagawa | 361/502 |
| 6,356,432 | B1 * | 3/2002 | Danel et al. | 361/502 |
| 7,045,108 | B2 | 5/2006 | Jiang et al. | |
| 7,704,480 | B2 | 4/2010 | Jiang et al. | |
| 7,826,198 | B2 * | 11/2010 | Jiang et al. | 361/502 |
| 8,120,892 | B2 * | 2/2012 | Kim et al. | 361/502 |

(Continued)

FOREIGN PATENT DOCUMENTS

| | | |
|---|---|---|
| CN | 1483667 A | 3/2004 |
| CN | 1982209 A | 6/2007 |

(Continued)

OTHER PUBLICATIONS

Li et al., Super-ionistors: Composite Electrodes of Carbon Nanotube and Nickel Oxide, Electronic Components & Materials vol. 22 No. 6, pp. 3-5.

(Continued)

*Primary Examiner* — Robert J Hoffberg
*Assistant Examiner* — Hung Dang
(74) *Attorney, Agent, or Firm* — Novak Druce Connolly Bove + Quigg LLP

(57) ABSTRACT

An electrochemical capacitor includes a first electrode, a second electrode, a membrane, and an electrolyte. The first electrode includes a carbon nanotube composite. The carbon nanotube composite includes a free-standing carbon nanotube structure, and a plurality of nano grains located on the carbon nanotube structure. The membrane is located between the first electrode and the second electrode, to separate the first electrode from the second electrode. The first electrode, the second electrode, and the membrane are disposed in the electrolyte.

17 Claims, 24 Drawing Sheets

(56) References Cited

U.S. PATENT DOCUMENTS

| | | | |
|---|---|---|---|
| 2004/0197638 | A1* | 10/2004 | McElrath et al. ............... 429/44 |
| 2005/0231892 | A1* | 10/2005 | Harvey ......................... 361/502 |
| 2005/0276743 | A1 | 12/2005 | Lacombe et al. |
| 2007/0166223 | A1 | 7/2007 | Jiang et al. |
| 2008/0299031 | A1 | 12/2008 | Liu et al. |
| 2009/0008712 | A1 | 1/2009 | Choi et al. |
| 2009/0116171 | A1 | 5/2009 | Liu et al. |
| 2009/0155467 | A1 | 6/2009 | Wang et al. |
| 2009/0168302 | A1 | 7/2009 | Jang et al. |
| 2009/0181239 | A1 | 7/2009 | Fan et al. |
| 2009/0197082 | A1 | 8/2009 | Jiang et al. |
| 2010/0178531 | A1* | 7/2010 | Amaratunga et al. ............ 429/7 |

FOREIGN PATENT DOCUMENTS

| | | |
|---|---|---|
| CN | 101471184 A | 7/2009 |
| JP | 2004-149954 | 5/2004 |
| JP | 2007-527099 | 9/2007 |
| JP | 2009-1481 | 1/2009 |
| JP | 2009-144158 | 7/2009 |
| JP | 2009-158961 | 7/2009 |
| JP | 2009-167092 | 7/2009 |
| JP | 2009-184910 | 8/2009 |
| TW | I247345 | 1/2006 |
| TW | 200923991 | 6/2009 |
| WO | WO2005069412 | 7/2005 |
| WO | WO2009031349 | 3/2009 |

OTHER PUBLICATIONS

Niu et al., High power electrochemical capacitors based on carbon nanotube electrodes, Apply Physics Letter,1997, vol. 70, p. 1480-1482.

Jiang et al., Spinning Continuous CNT Yarns, Nature, 2002, vol. 419, p. 801.

* cited by examiner

CARBON NANOTUBE COMPOSITE, METHOD FOR MAKING THE SAME, AND ELECTROCHEMICAL CAPACITOR USING THE SAME

RELATED APPLICATIONS

This application claims all benefits accruing under 35 U.S.C. §119 from China Patent Application No. 200910110322.0, filed on Oct. 23, 2009 No. 200910110320.1, filed on Oct. 23, 2009 and No. 200910189146.4, filed on Dec. 18, 2009 in the China Intellectual Property Office, the contents of which are hereby incorporated by reference. This application is a continuation of U.S. patent application Ser. No. 12/822,308, filed on Jun. 24, 2010 entitled, "CARBON NANOTUBE COMPOSITE, METHOD FOR MAKING THE SAME, AND ELECTROCHEMICAL CAPACITOR USING THE SAME".

BACKGROUND

1. Technical Field

The present disclosure relates to composites, particularly, to a carbon nanotube composite, a method for making the same, and an electrochemical capacitor using the same.

2. Description of Related Art

Carbon nanotubes (CNT) are a novel carbonaceous material having extremely small size and extremely large specific surface area. Carbon nanotubes have interesting and potentially useful electrical and mechanical properties, and have been widely used in a plurality of fields such as emitters, gas storage and separation, chemical sensors, and high strength composites.

However, the main obstacle in applying carbon nanotubes is the difficulty in processing the common powder form of the carbon nanotube products. Therefore, forming separate and tiny carbon nanotubes into manipulable carbon nanotube structures is necessary.

Recently, as disclosed by Jiang et al., Nature, 2002, vol. 419, p801, Spinning Continuous CNT Yarns, a free-standing carbon nanotube yarn has been fabricated. The carbon nanotube yarn is directly drawn from a carbon nanotube array. The carbon nanotube yarn includes a plurality of carbon nanotubes joined end-to-end by van der Waals attractive force therebetween. The carbon nanotubes are substantially parallel to an axis of the carbon nanotube yarn. However, the mechanical strength and toughness of the carbon nanotube yarn is not relatively high.

It is becoming increasingly popular for CNTs to be used to make composite materials. Composites of carbon nanotubes and metals, semiconductors, or polymers resulting in material with qualities of both materials used in the composite. Often, the method for producing a carbon nanotube composite includes a stirring step or vibration step to disperse carbon nanotube powder in the composite matrix. However, carbon nanotubes have extremely high surface energy and are prone to aggregate. Therefore, it is very difficult to achieve a composite with carbon nanotubes evenly dispersed therein.

An electrochemical capacitor using carbon nanotubes has been disclosed by Chunming Niu et al., High power electrochemical capacitors based on carbon nanotube electrodes, Apply Physics Letter, vol 70, p1480-1482 (1997). An electrode film of the electrochemical capacitor is formed from carbon nanotube powder. However, the carbon nanotube powder is prone to aggregate during the formation of the electrode film. The aggregated carbon nanotubes negatively impact desirable properties of the electrochemical capacitor.

What is needed, therefore, is to provide a carbon nanotube composite with improved tensile strength and Young's modulus, a method for making the same and avoiding aggregation of the carbon nanotubes used, and an electrochemical capacitor using the same with relatively high power density and energy density.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
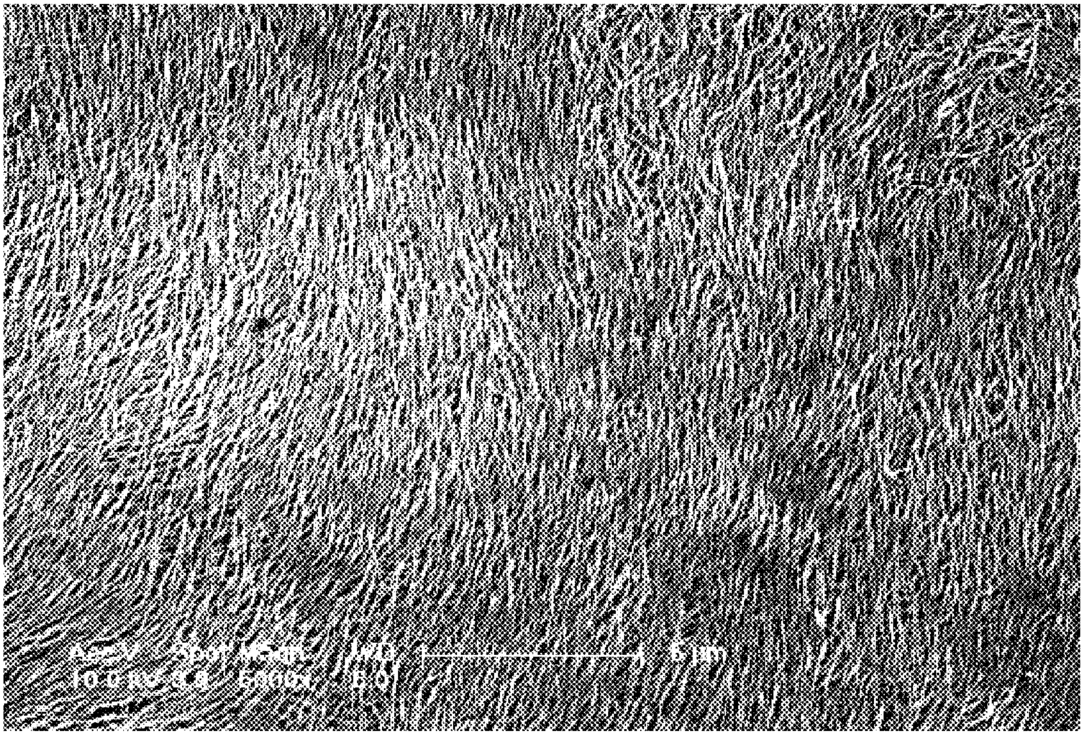
FIG. 1 shows a scanning electron microscope (SEM) image of a flocculated carbon nanotube film with carbon nanotubes entangled with each other therein.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A carbon nanotube composite of the application is based on a free-standing carbon nanotube structure.

Free-Standing Carbon Nanotube Structure

The carbon nanotube structure includes a plurality of carbon nanotubes. The carbon nanotubes in the carbon nanotube structure are combined by van der Waals attractive force therebetween. The carbon nanotube structure can be film shaped. The term "free-standing" includes, but is not limited to, a structure that does not have to be supported by a substrate and can sustain the weight of itself when it is hoisted by a portion thereof without any significant damage to its structural integrity. The free-standing property is achieved only due to the van der Waals attractive force between adjacent carbon nanotubes in the free-standing carbon nanotube structure. The free-standing carbon nanotube structure includes a plurality of micropores and/or clearances defined by carbon nanotubes therein. The size of the micropore and the clearance can be less than 10 microns (μm). The carbon nanotube structure has a large specific surface area (e.g., above 30 $m^2/g$).

The carbon nanotubes in the free-standing carbon nanotube structure can be orderly or disorderly aligned. The disorderly aligned carbon nanotubes are carbon nanotubes arranged along many different directions, such that the number of carbon nanotubes arranged along each different direction can be almost the same (e.g. uniformly disordered); and/or entangled with each other. The orderly aligned carbon nanotubes are carbon nanotubes arranged in a consistently systematic manner, e.g., most of the carbon nanotubes are arranged approximately along a same direction or have two or more sections within each of which the most of the carbon nanotubes are arranged approximately along a same direction (different sections can have different directions). The carbon nanotubes can be selected from single-walled, double-walled, and/or multi-walled carbon nanotubes. The diameters of the single-walled carbon nanotubes range from about 0.5 nanometers (nm) to about 50 nm. The diameters of the double-walled carbon nanotubes range from about 1 nm to about 50 nm. The diameters of the multi-walled carbon nanotubes range from about 1.5 nm to about 50 nm.

The free-standing carbon nanotube structure may have a planar shape or a linear shape. The thickness of the planar shaped carbon nanotube structure may range from about 0.5 nm to about 1 millimeter.

The carbon nanotube structure can include at least one carbon nanotube film, at least one carbon nanotube wire structure, or the combination of the carbon nanotube film and the carbon nanotube wire structure. When the carbon nanotube structure includes a plurality of carbon nanotube films, the carbon nanotube films in the carbon nanotube structure can be coplanar and/or stacked. Coplanar carbon nanotube films can also be stacked upon other coplanar films. When the carbon nanotube structure includes a single carbon nanotube wire structure, the carbon nanotube wire structure can be straight or curved to form the wire shaped carbon nanotube structure, or be folded or coiled to form the planar shaped carbon nanotube structure. If the carbon nanotube structure includes a plurality of carbon nanotube wire structures, the carbon nanotube wire structures can be substantially parallel to each other, crossed with each other, or weaved together to form the linear shaped or planar shaped carbon nanotube structure. It is to be understood that, the plurality of carbon nanotube wire structures can be weaved to form a carbon nanotube cloth. If the carbon nanotube structure includes both the carbon nanotube wire structure and the carbon nanotube film, the substantially parallel, crossed, or weaved carbon nanotube wire structures can be arranged on a surface of the carbon nanotube film or sandwiched by two carbon nanotube films.

Referring to FIG. 1, the carbon nanotube film can be a flocculated carbon nanotube film formed by a flocculating method. The flocculated carbon nanotube film can include a plurality of long, curved, disordered carbon nanotubes entangled with each other. A length of the carbon nanotubes can be greater than 10 centimeters. In one embodiment, the length of the carbon nanotubes is in a range from about 200 μm to about 900 μm. Further, the flocculated carbon nanotube film can be isotropic. Here, "isotropic" means the carbon nanotube film has properties identical in all directions substantially parallel to a surface of the carbon nanotube film. The carbon nanotubes can be substantially uniformly distributed in the carbon nanotube film. The adjacent carbon nanotubes are acted upon by the van der Waals attractive force therebetween, thereby forming an entangled structure with micropores defined therein. It is understood that the flocculated carbon nanotube film is very porous. Sizes of the micropores can be less than 10 micrometers. The thickness of the flocculated carbon nanotube film can range from about 1 μm to about 1 mm. In one embodiment, the thickness of the flocculated carbon nanotube film is about 100 μm.

Figure 2:
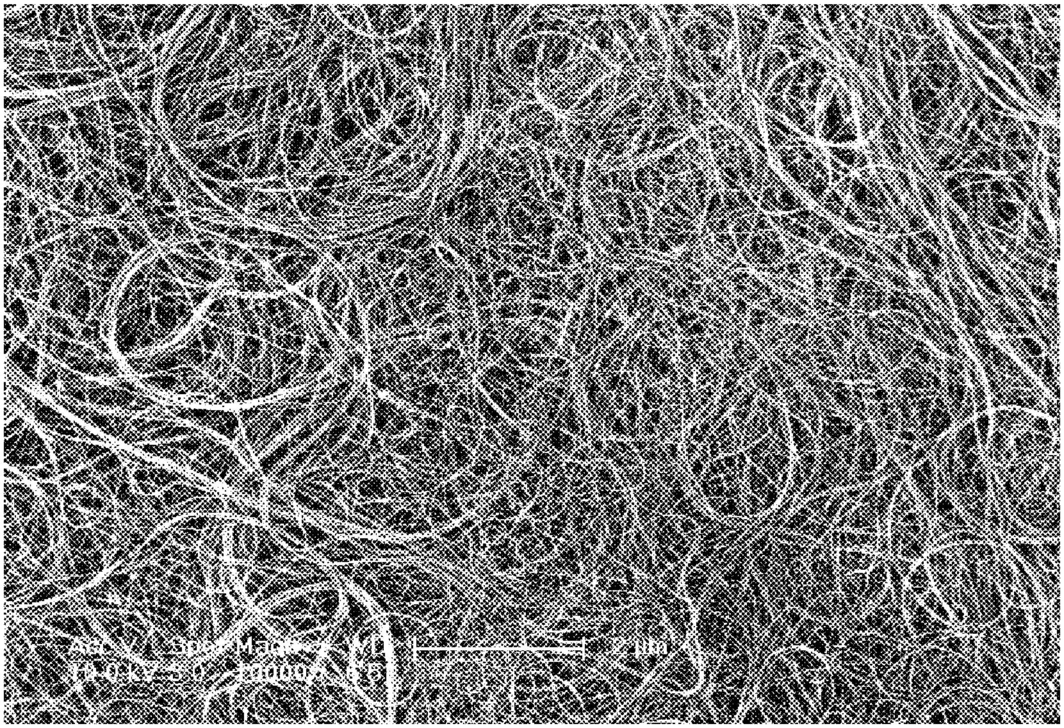
FIG. 2 shows an SEM image of a pressed carbon nanotube film with the carbon nanotubes therein arranged along a preferred orientation.

Referring to FIG. 2, the carbon nanotube film can also be a pressed carbon nanotube film formed by pressing a carbon nanotube array down on the substrate. The carbon nanotubes in the pressed carbon nanotube film are arranged along a same direction or along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. When the carbon nanotubes in the pressed carbon nanotube film are arranged along different directions, the carbon nanotube structure can be isotropic. The thickness of the pressed carbon nanotube film can range from about 0.5 nm to about 1 mm. The length of the carbon nanotubes can be larger than 50 μm. Clearances can exist in the carbon nanotube array. Therefore, micropores can exist in the pressed carbon nanotube film and be defined by the adjacent carbon nanotubes. Examples of pressed carbon nanotube film are taught by US PGPub. 20080299031A1 to Liu et al.

Figure 3:
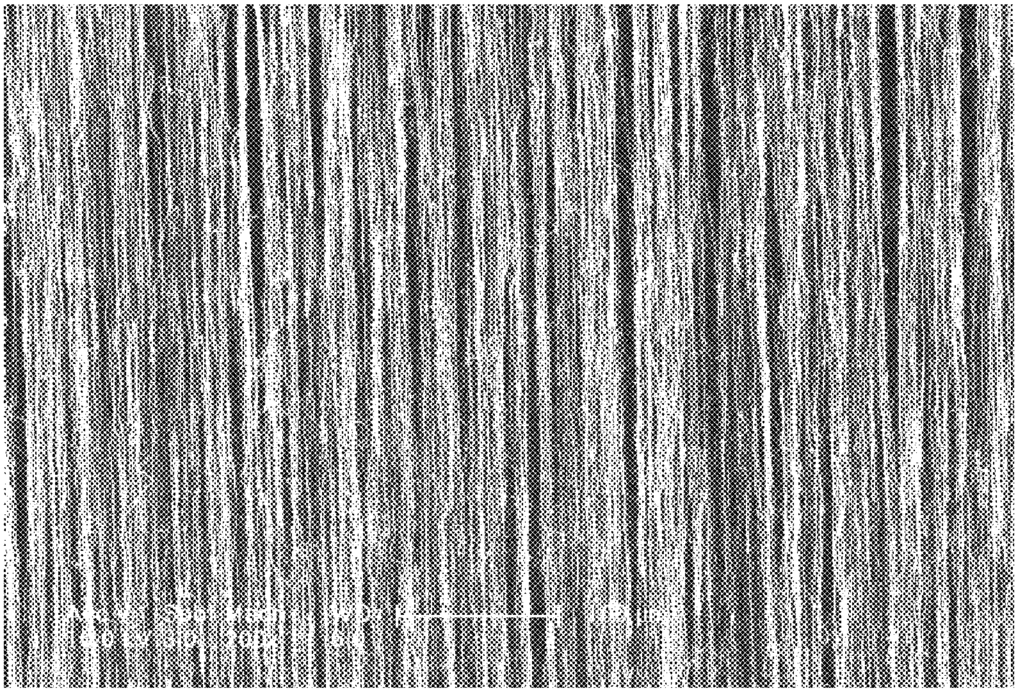
FIG. 3 shows an SEM image of a drawn carbon nanotube film.

Referring to FIG. 3, the carbon nanotube film can also be a drawn carbon nanotube film formed by drawing a film from a carbon nanotube array. Examples of the drawn carbon nanotube film are taught by U.S. Pat. No. 7,045,108 to Jiang et al. The drawn carbon nanotube film can have a large specific surface area (e.g., above 100 $m^2/g$). In one embodiment, the drawn carbon nanotube film has a specific surface area in the range of about 200 $m^2/g$ to about 2600 $m^2/g$. In one embodiment, the drawn carbon nanotube film has a specific weight of about 0.05 $g/m^2$. The thickness of the drawn carbon nanotube film can be in a range from about 0.5 nm to about 50 nm. If the thickness of the drawn carbon nanotube film is small enough (e.g., smaller than 10 μm), the drawn carbon nanotube film is substantially transparent.

The drawn carbon nanotube film includes a plurality of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. The carbon nanotubes in the drawn carbon nanotube film are also substantially oriented along a preferred orientation. The width of the drawn carbon nanotube film relates to the carbon nanotube array from which the drawn carbon nanotube film is drawn.

The carbon nanotube structure can include more than one drawn carbon nanotube film. An angle can exist between the orientation of carbon nanotubes in adjacent films, stacked and/or coplanar. Adjacent carbon nanotube films can be combined by only the van der Waals attractive force therebetween without the need of an additional adhesive. An angle between the aligned directions of the carbon nanotubes in two adjacent drawn carbon nanotube films can range from about 0 degrees to about 90 degrees. Spaces are defined between two adjacent carbon nanotubes in the drawn carbon nanotube film. When the angle between the aligned directions of the carbon nanotubes in adjacent drawn carbon nanotube films is larger than 0 degrees, the micropores can be defined by the crossed carbon nanotubes in adjacent drawn carbon nanotube films. Stacking the carbon nanotube films will add to the structural integrity of the carbon nanotube structure.

The carbon nanotube wire structure can also include at least one carbon nanotube wire. If the carbon nanotube wire structure includes a plurality of carbon nanotube wires, the carbon nanotube wires can be substantially parallel to each other to form a bundle-like structure or twisted with each other to form a twisted structure. The bundle-like structure and the twisted structure are two kinds of linear shaped carbon nanotube structures.

Figure 4:
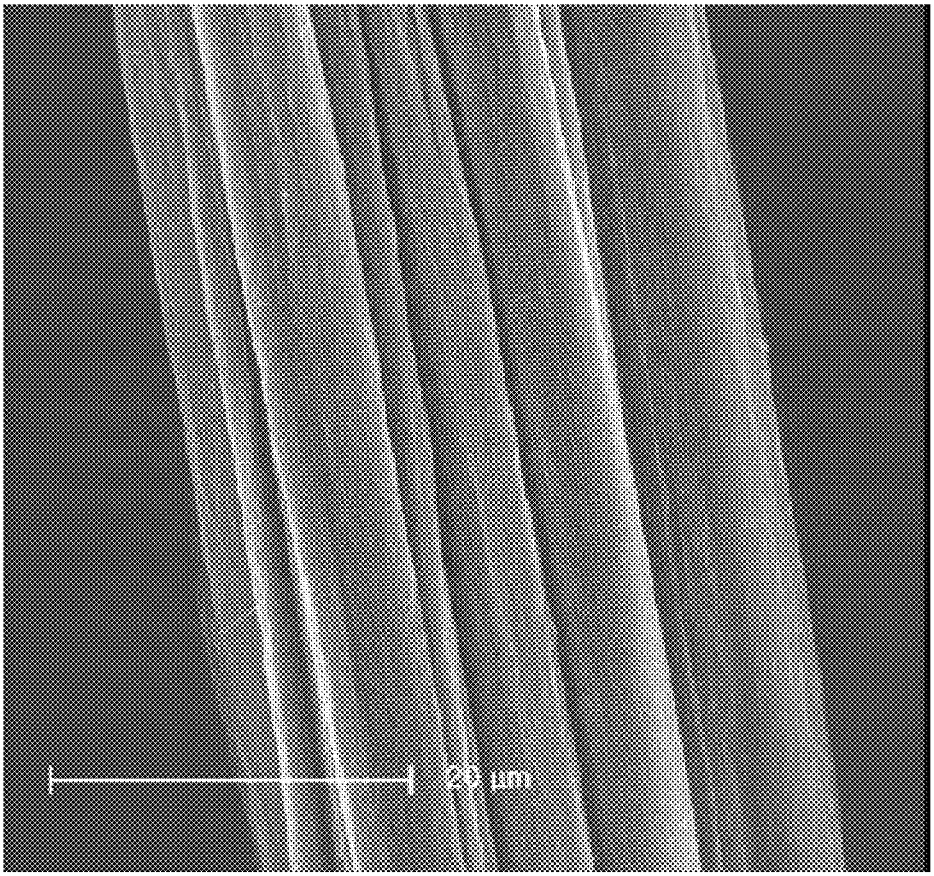
FIG. 4 shows an SEM image of an untwisted carbon nanotube wire.

The carbon nanotube wire itself can be untwisted or twisted. Referring to FIG. 4, treating the drawn carbon nanotube film with a volatile organic solvent can obtain the untwisted carbon nanotube wire. In one embodiment, the organic solvent is applied to soak the entire surface of the drawn carbon nanotube film. During the soaking, adjacent substantially parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire). The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. A length of the untwisted carbon nanotube wire can be arbitrarily set as desired. A diameter of the untwisted carbon nanotube wire ranges from about 0.5 nm to about 100 μm. Examples of the untwisted carbon nanotube wire is taught by US Patent Application Publication US 2007/0166223 to Jiang et al.

Figure 5:
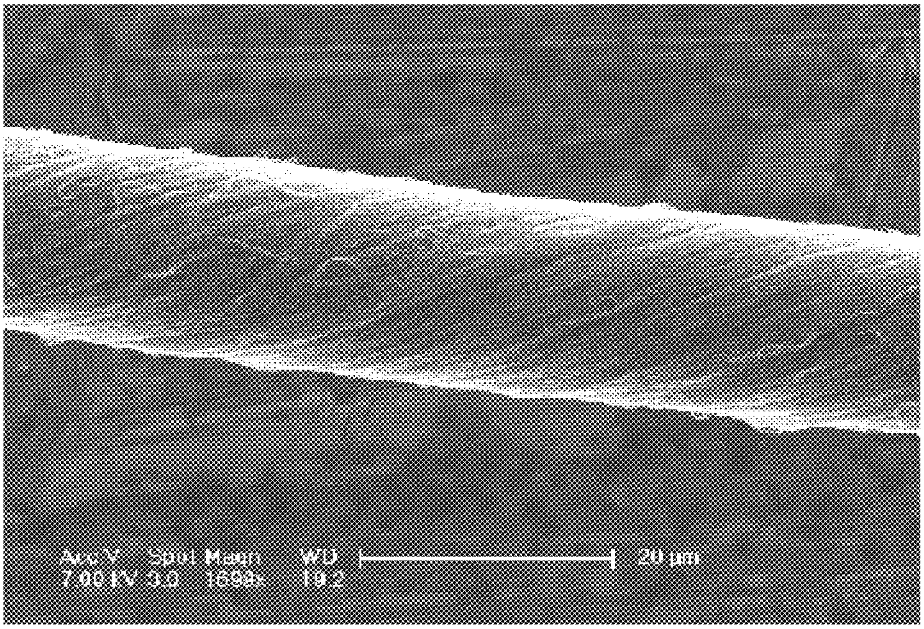
FIG. 5 shows an SEM image of a twisted carbon nanotube wire.

Referring to FIG. 5, the twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nm to about 100 μm.

The twisted carbon nanotube wire can be treated with a volatile organic solvent, before or after being twisted. After being soaked by the organic solvent, the adjacent substantially parallel carbon nanotubes in the twisted carbon nanotube wire will bundle together, due to the surface tension of the organic solvent when the organic solvent volatilizes. The specific surface area of the twisted carbon nanotube wire will decrease. The density and strength of the twisted carbon nanotube wire will be increased.

Carbon Nanotube Composite

Figure 6:
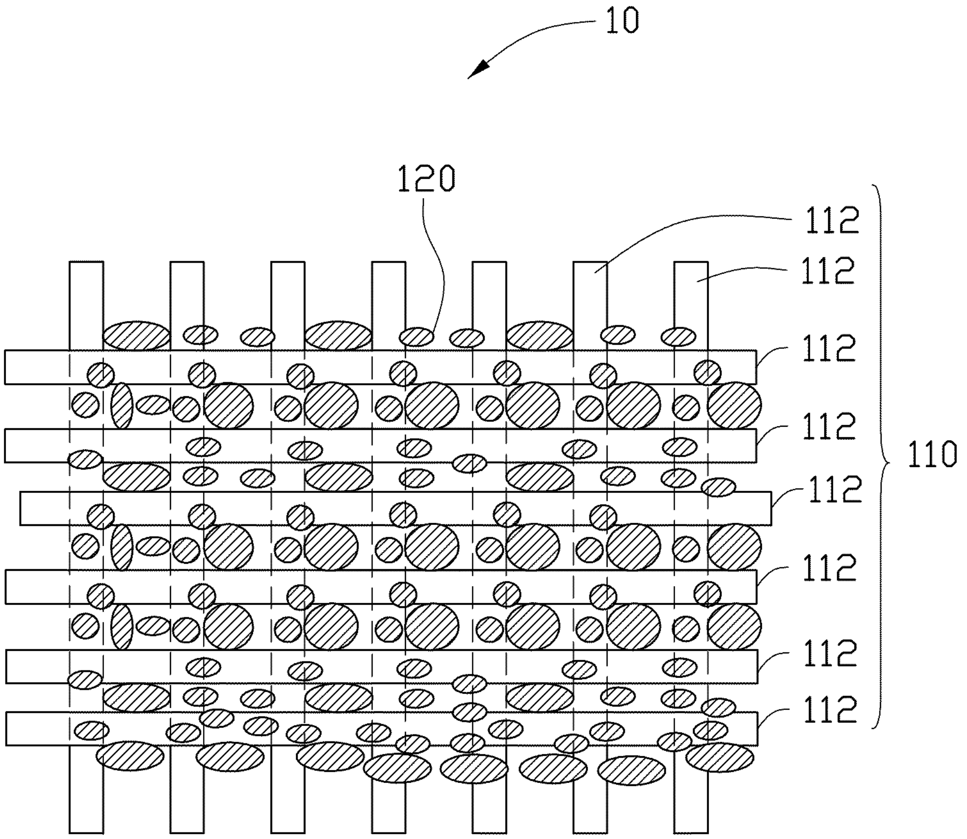
FIG. 6 is a schematic view of a first embodiment of a carbon nanotube composite.
Figure 7:
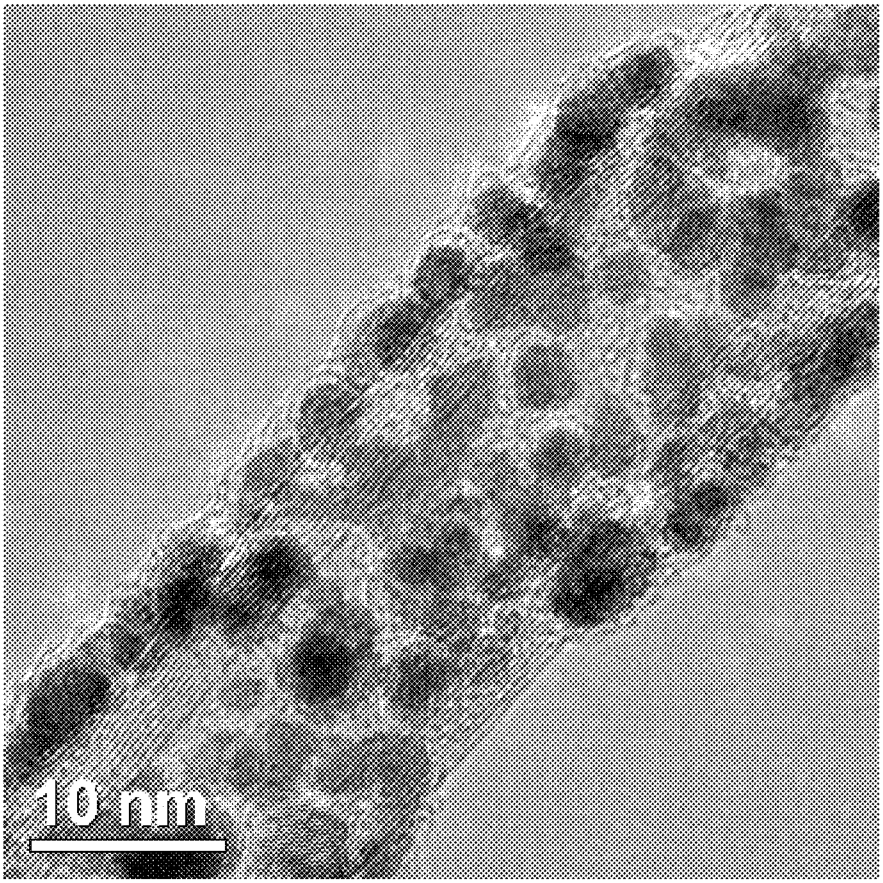
FIG. 7 shows a transmission electron microscope (TEM) image of a carbon nanotube with $CO_3O_4$ grains thereon in the first embodiment of the carbon nanotube composite.

Referring to FIG. 6 and FIG. 7, a first embodiment of a carbon nanotube composite 10 includes a free-standing carbon nanotube structure 110 and a plurality of reinforcements 120. The free-standing carbon nanotube structure 110 includes a plurality of carbon nanotubes 112. The reinforcements 120 are located on the outer surface of the carbon nanotubes 112. The reinforcements 120 combine the carbon nanotubes 112 together.

In one embodiment, each of the carbon nanotubes 112 has the reinforcements 120 located on the outer surface thereof. The adjacent side-by-side carbon nanotubes 112 can be combined together by the reinforcements 120.

The reinforcements 120 can be uniformly distributed on the outer surface of each of the carbon nanotubes 112. On the same carbon nanotube 112, the reinforcements 120 can be spaced from each other or contact each other. In the carbon nanotube composite 10, the reinforcements 120 can be at the area where two carbon nanotubes 112 contact each other and in the clearances and/or micropores of the carbon nanotube structure 110. Therefore, the contacting carbon nanotubes 112 can be joined together not only by the van der Waals attractive force therebetween but also by the reinforcements 120. Therefore, the binding contact between the carbon nanotubes 112 is reinforced, and the carbon nanotube composite 10 has better tensile strength and Young's modulus than the carbon nanotube structure 110.

The material of the reinforcements 120 can be at least one of metal and metal oxide. The metal can be zinc (Zn), iron (Fe), cobalt (Co), manganese (Mn), copper (Cu), nickel (Ni), gold (Au), silver (Ag), platinum (Pt), rhodium (Rh), ruthenium (Ru), palladium (Pd), and alloys thereof. The metal oxide can be zinc oxide (ZnO), ferric oxide ($Fe_2O_3$), magnetite ($Fe_3O_4$), manganese dioxide ($MnO_2$), nickel oxide ($NiO_2$), copper oxide (CuO), cobalt oxide ($CO_3O_4$), cobalt (III) oxide ($CO_2O_3$), or combinations thereof.

The reinforcements 120 are a plurality of reinforcing grains. The sizes of the reinforcing grains can be very small, such as about 1 nm to about 50 nm. In one embodiment, the size of the reinforcing grains is about 1 nm to about 20 nm. The reinforcing grains are located on the outer surface of each of the carbon nanotubes 112 of the carbon nanotube structure 110.

In one embodiment, the reinforcements 120 are a plurality of nano sized $CO_3O_4$ grains. The nano sized $CO_3O_4$ grains are distributed on the outer surface of each of the carbon nanotubes 112, spaced from each other, and are distributed between adjacent carbon nanotubes 112 to combine the carbon nanotubes 112 together. The size of the nano sized $CO_3O_4$ grain is about 1 nm to about 20 nm. It can be understood that the reinforcements 120 can include two or more kinds of reinforcing grains made of different materials distributed on the same outer surface of the carbon nanotube.

Figure 8:
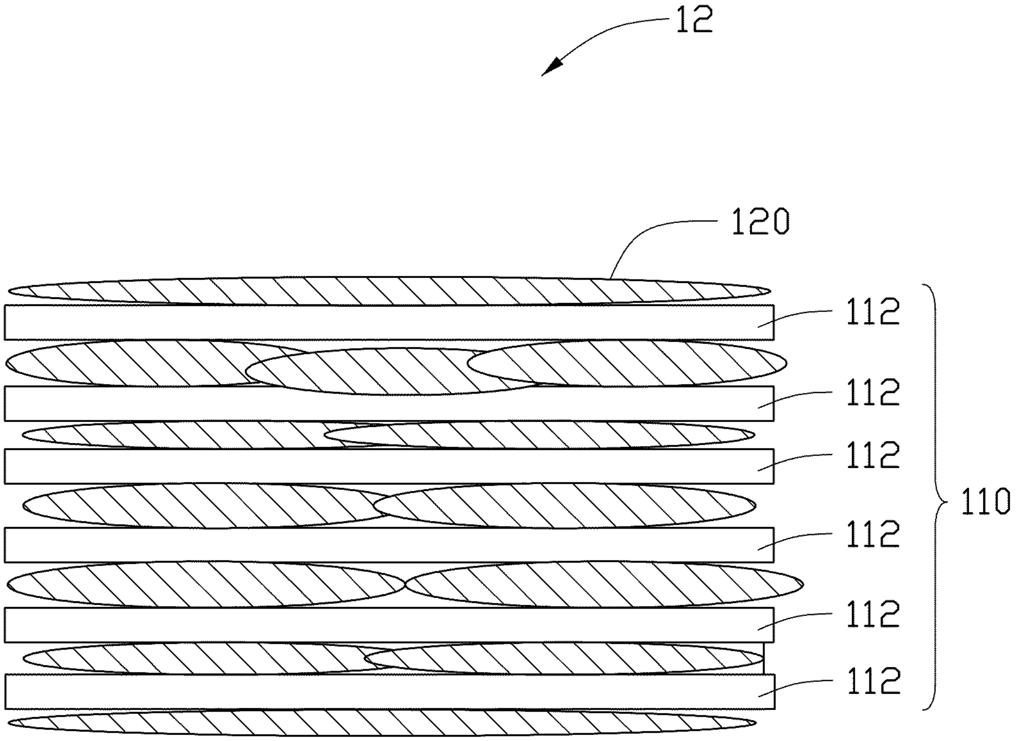
FIG. 8 is a schematic view of a second embodiment of the carbon nanotube composite.
Figure 9:
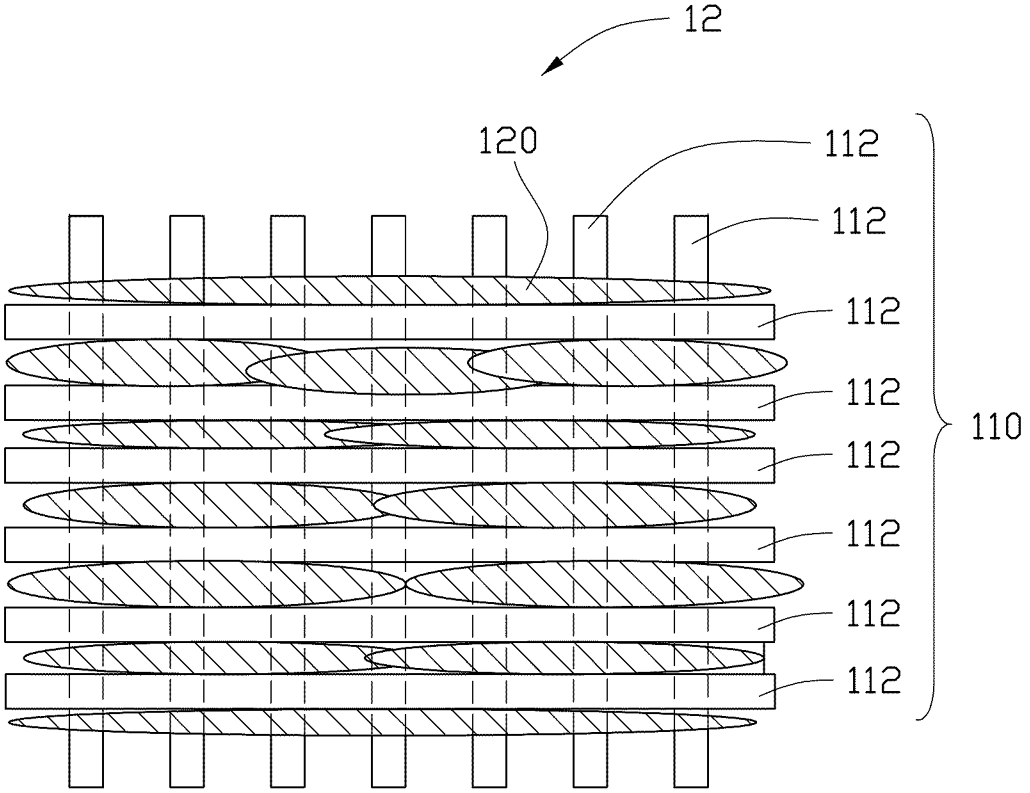
FIG. 9 is a schematic view of another embodiment of the carbon nanotube composite of FIG. 8.
Figure 10:
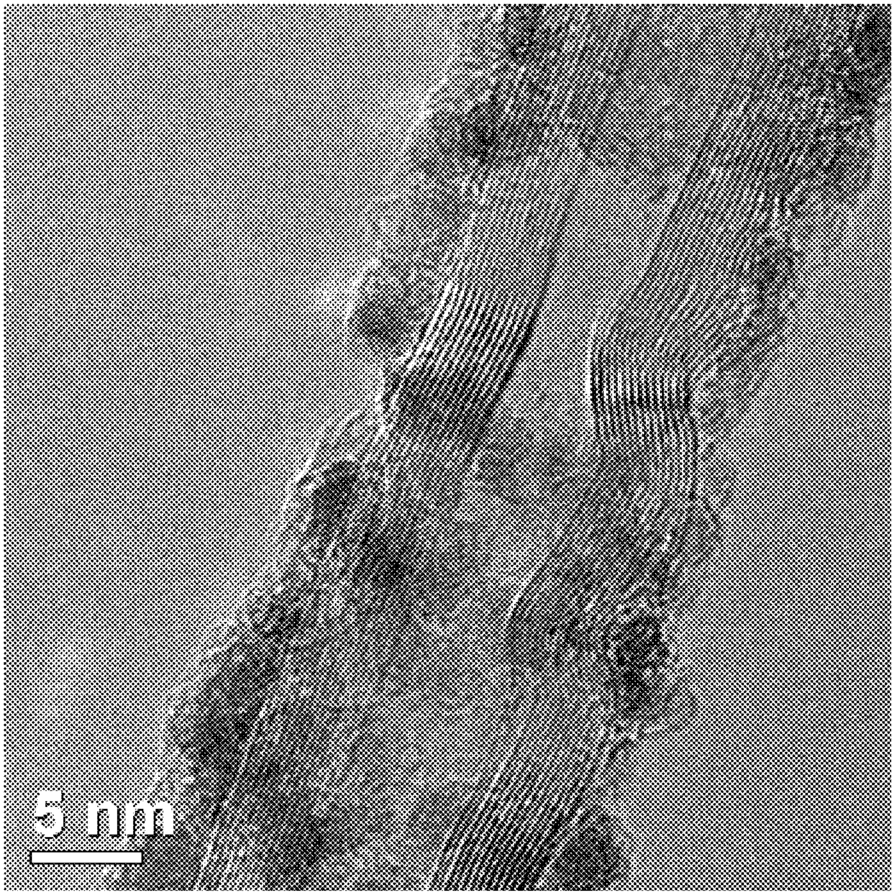
FIG. 10 shows a TEM image of a carbon nanotube with platinum metal layers thereon in one embodiment of the carbon nanotube composite.

Referring to FIGS. 8 to 10, each of the reinforcements 120 of a second embodiment of a carbon nanotube composite 12 can form a reinforcing layer on the outer surface of each carbon nanotube 112. The carbon nanotube composite 12 can include a plurality of reinforcing layers located on the plurality of carbon nanotubes. The reinforcing layer is formed by the reinforcing grains in contact with each other on the same carbon nanotube 112. The adjacent carbon nanotubes 112 can be combined by the reinforcing layers located on the outer surfaces of the carbon nanotubes 112. A thickness of the reinforcing layer can be from about 1 nm to about 1 μm. In one embodiment, the thickness of the reinforcing layer is about 1 nm to about 100 nm. The carbon nanotube structure 110 can include carbon nanotubes 112 substantially aligned along the same direction, or perpendicular to each other.

In one embodiment, the reinforcements 120 are Pt layers located on the outer surface of each of the carbon nanotubes 112. The Pt layers are formed from a plurality of Pt grains. The thickness of the Pt layer is about 1 nm to about 15 nm. The Pt layers have high conductivity, thus the carbon nanotube composite 12 has a high conductivity and can be used as an electrode.

It is to be understood that each reinforcing layer can be formed from two or more kinds of reinforcing grains made of different materials. The reinforcements 120 can include two or more kinds of reinforcing layers made of different materials.

Figure 11:
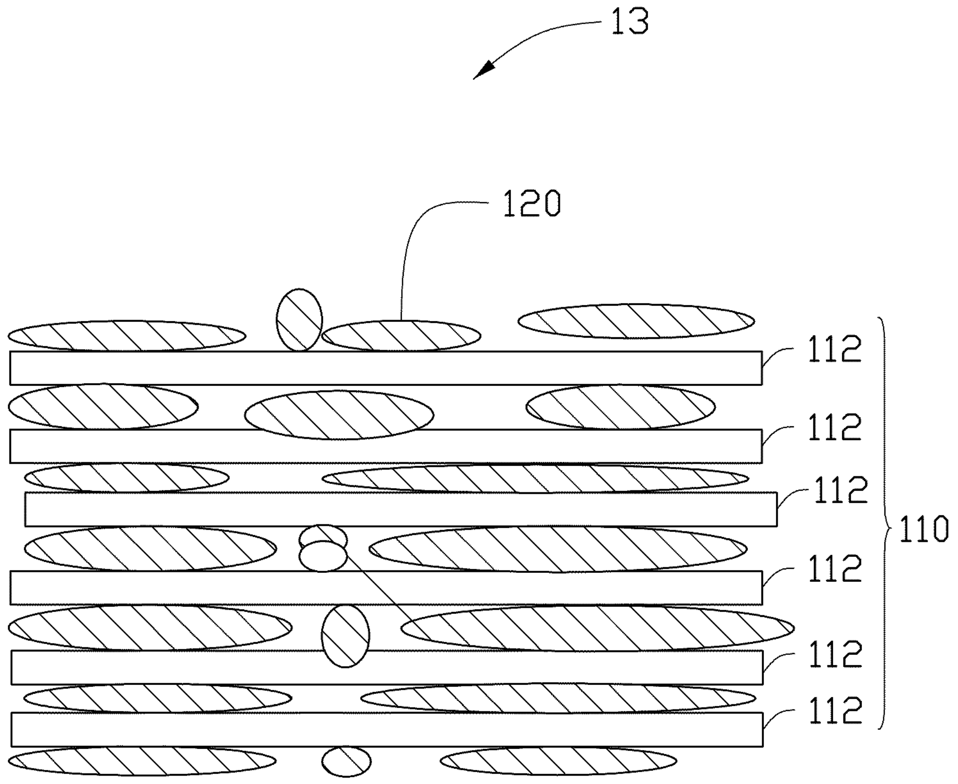
FIG. 11 is a schematic view of a third embodiment of the carbon nanotube composite.
Figure 12:
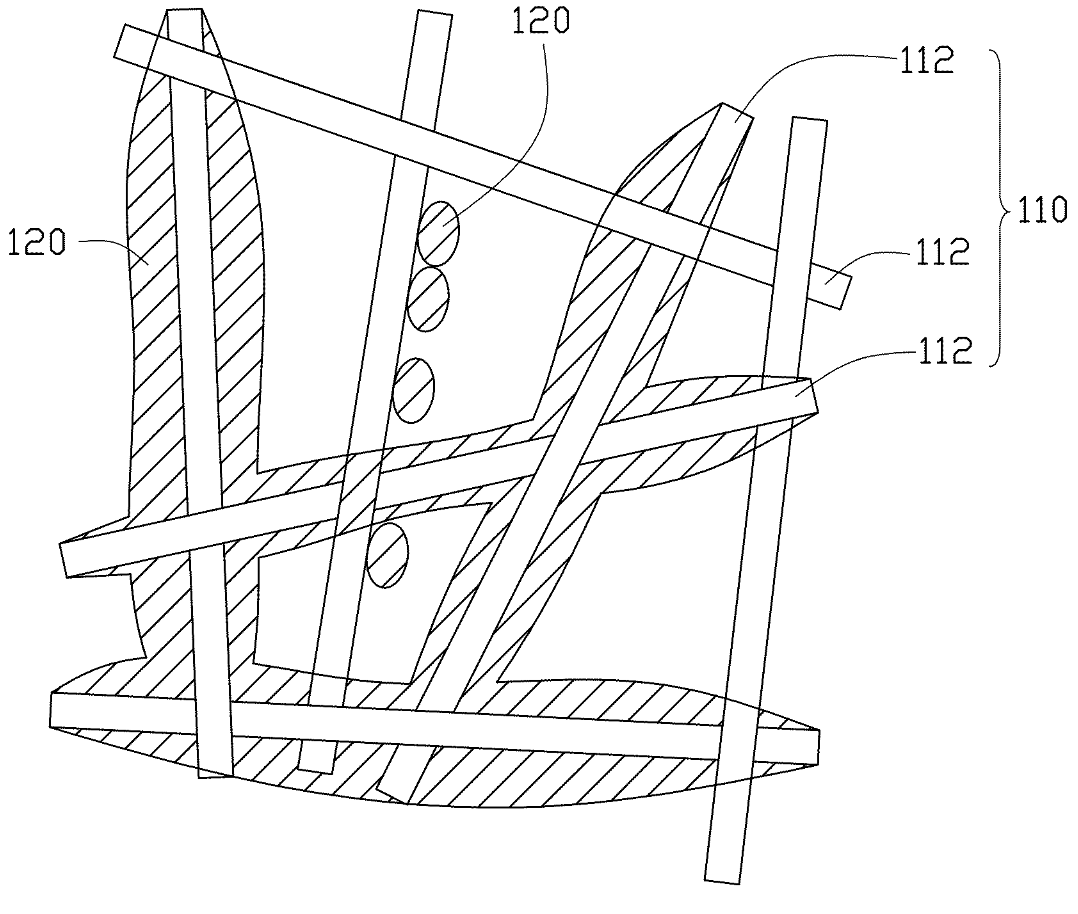
FIG. 12 is a schematic view of another embodiment of the carbon nanotube composite of FIG. 11.

Referring to FIG. 11, the reinforcements 120 of a third embodiment of a carbon nanotube composite 13 are a combination of the reinforcing grains and the reinforcing layers. Referring to FIG. 12, in the carbon nanotube composite 13, not all of the carbon nanotubes 112 need to be covered by the reinforcements 120, and each reinforcement 120 is not required to cover only one carbon nanotube 112. That is, two or more carbon nanotubes 112 can be covered by the same reinforcement layer.

In one embodiment, one ZnO layer can be located on the outer surfaces of one or more carbon nanotubes 112, and some carbon nanotubes in the carbon nanotube composite 13 can have no reinforcement thereon. This situation may happen if the carbon nanotube structure is relatively thick, or the carbon nanotubes are entangled with each other.

Figure 13:
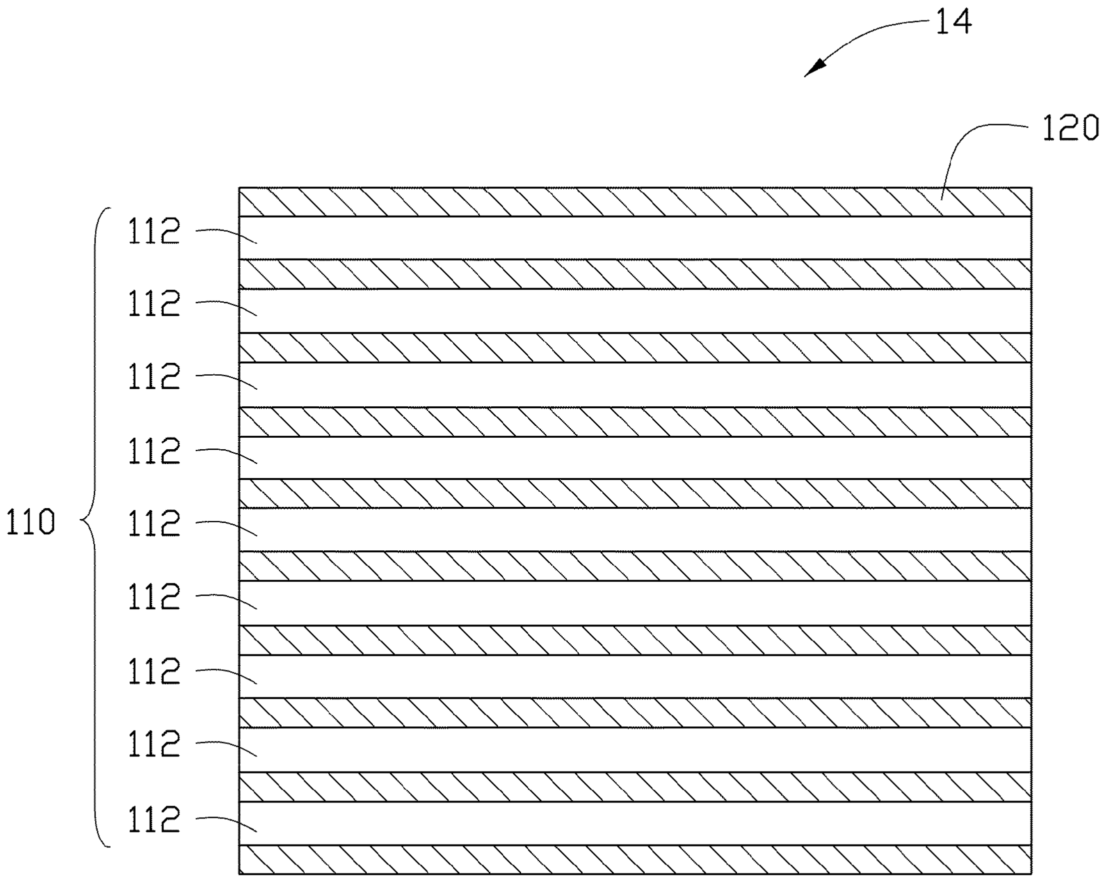
FIG. 13 is a schematic view of a fourth embodiment of the carbon nanotube composite.

Referring to FIG. 13, the reinforcements 120 of a fourth embodiment of a carbon nanotube composite 14 can fill all the micropores and/or clearances of the carbon nanotube structure 110, such that there may be no micropores and/or clearances in the carbon nanotube composite 14.

Figure 14:
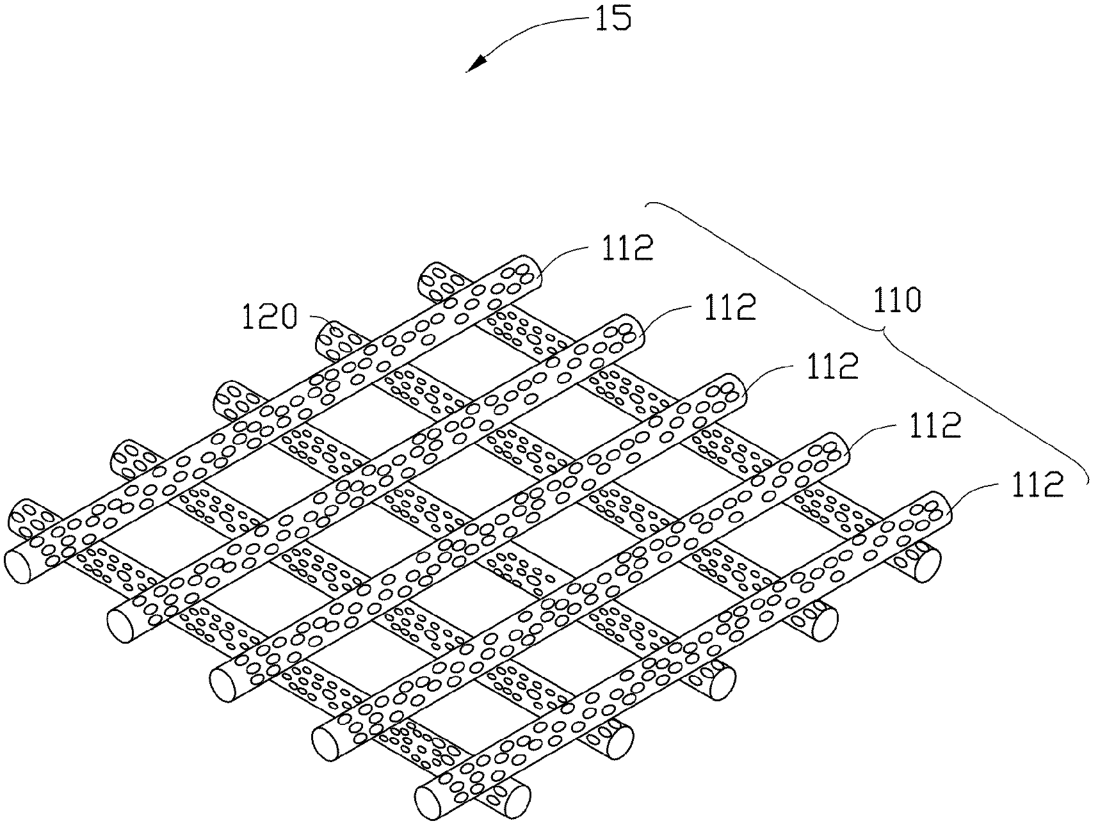
FIG. 14 is a schematic view of a fifth embodiment of the carbon nanotube composite.
Figure 15:
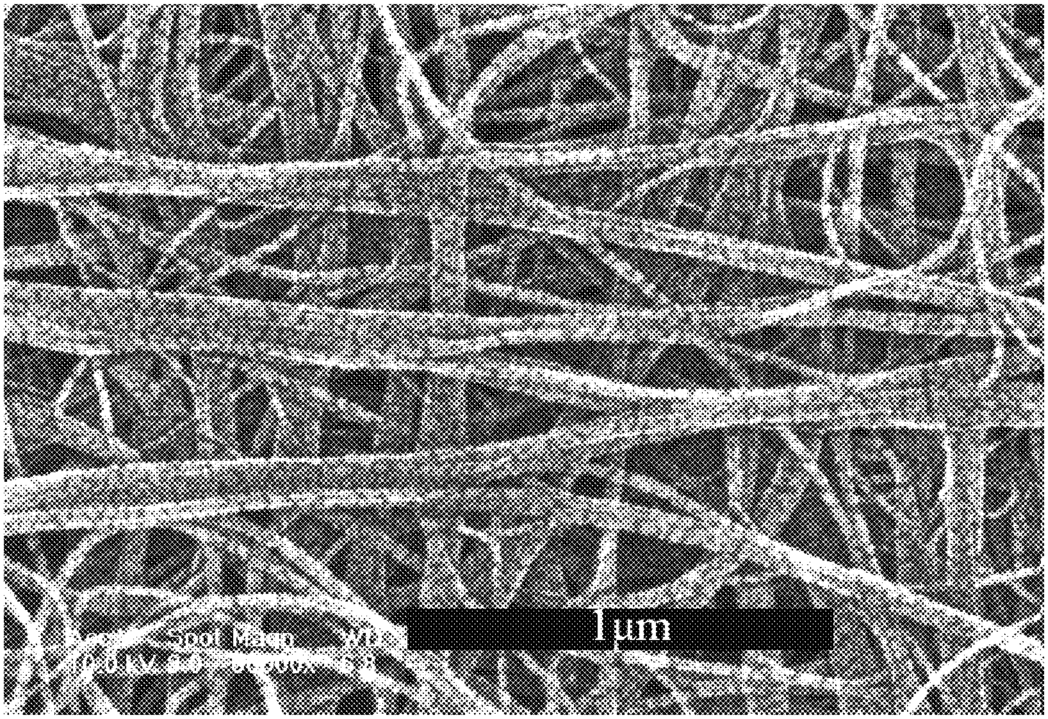
FIG. 15 shows an SEM image of a carbon nanotube structure with $MnO_2$ grains thereon in the fifth embodiment of the carbon nanotube composite.

Referring to FIG. 14 and FIG. 15, the reinforcements 120 of a fifth embodiment of a carbon nanotube composite 15 may only be located on the outer surface of the carbon nanotubes of the carbon nanotube structure 110, and not fill the micropores and/or clearances of the carbon nanotube structure 110. Accordingly, the carbon nanotube composite 15 also includes a plurality of micropores and/or clearances in the carbon nanotube structure 110.

If the carbon nanotube structure 110 has a linear shape, the carbon nanotube composite 10, 12, 13, 14, 15 is a composite wire. If the carbon nanotube structure 110 has a planar shape, the carbon nanotube composite 10, 12, 13, 14, 15 is a composite film.

Figure 16:
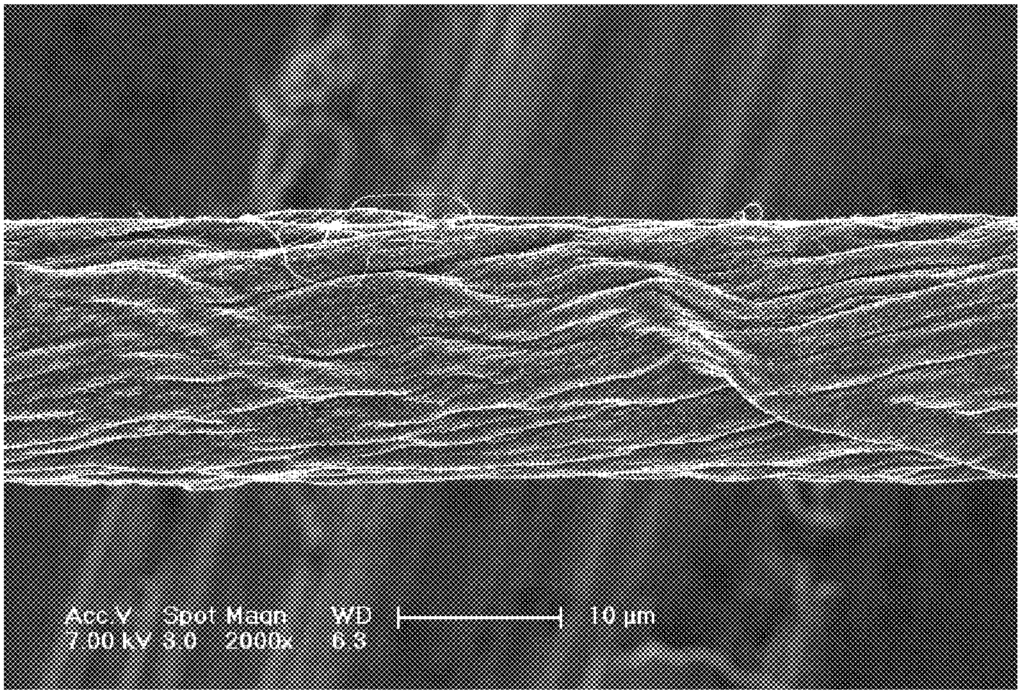
FIG. 16 shows an SEM image of a carbon nanotube composite in low scale.
Figure 17:
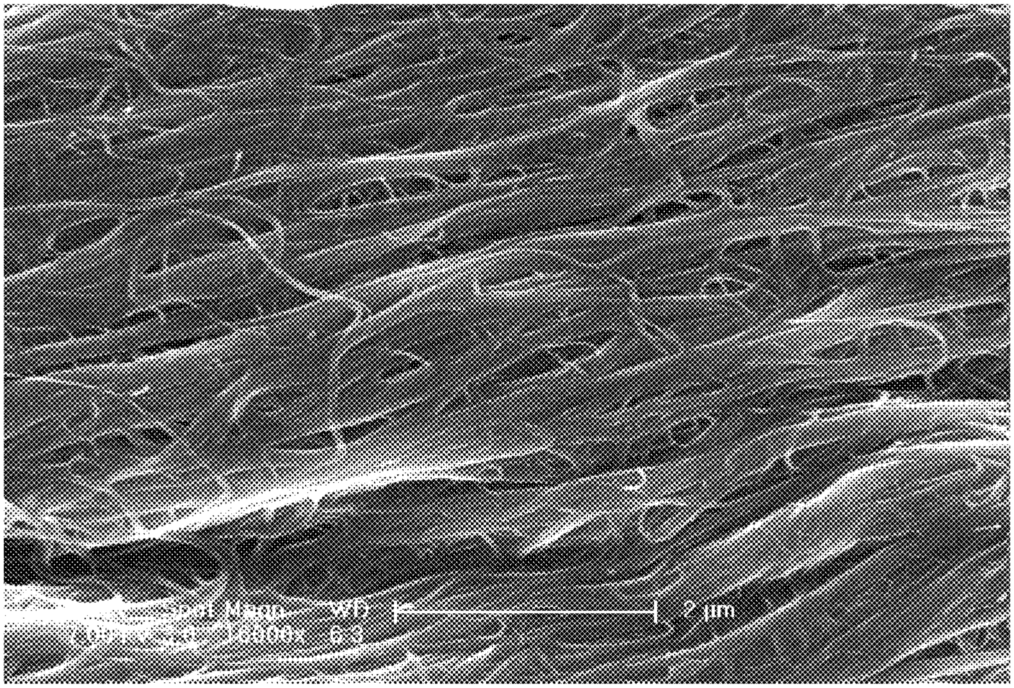
FIG. 17 shows an SEM image of a carbon nanotube composite in high scale.

Referring to FIG. 16 and FIG. 17, in one embodiment, the composite wire is a $Fe_2O_3$-carbon nanotube composite 14, and the reinforcements 120 form reinforcing layers made of $Fe_2O_3$. The carbon nanotube structure 110 is a carbon nanotube twisted wire, and the $Fe_2O_3$-carbon nanotube composite 14 also has a twisted wire structure. The outer surface of each of the carbon nanotubes is covered by one $Fe_2O_3$ layer. In comparison to the carbon nanotube structure 110 shown in FIGS. 4 to 5, in the carbon nanotube composite 14 of FIG. 17, the adjacent carbon nanotubes in the carbon nanotube twisted wire are combined by the $Fe_2O_3$ layer.

It is to be understood that the reinforcements 120 can join the adjacent carbon nanotubes 112 of the carbon nanotube structure 110 together. The reinforcements 120 are attached to the walls of the carbon nanotubes 112 by physical or chemical adsorption. The reinforcements 120 can be produced on the carbon nanotubes 112 through an in situ process. Therefore, the binding force between the carbon nanotubes 112 and the reinforcements 120 is very strong, and the structure of the carbon nanotube composite 10, 12, 13, 14, 15 is distinct from a mixture made by simply mixing the carbon nanotubes 112 and the previously achieved reinforcements 120 together. The strong binding force between the reinforcements 120 and the carbon nanotubes 112 can improve the tensile strength and Young's modulus of the carbon nanotube composite 10, 12, 13, 14, 15.

Figure 18:
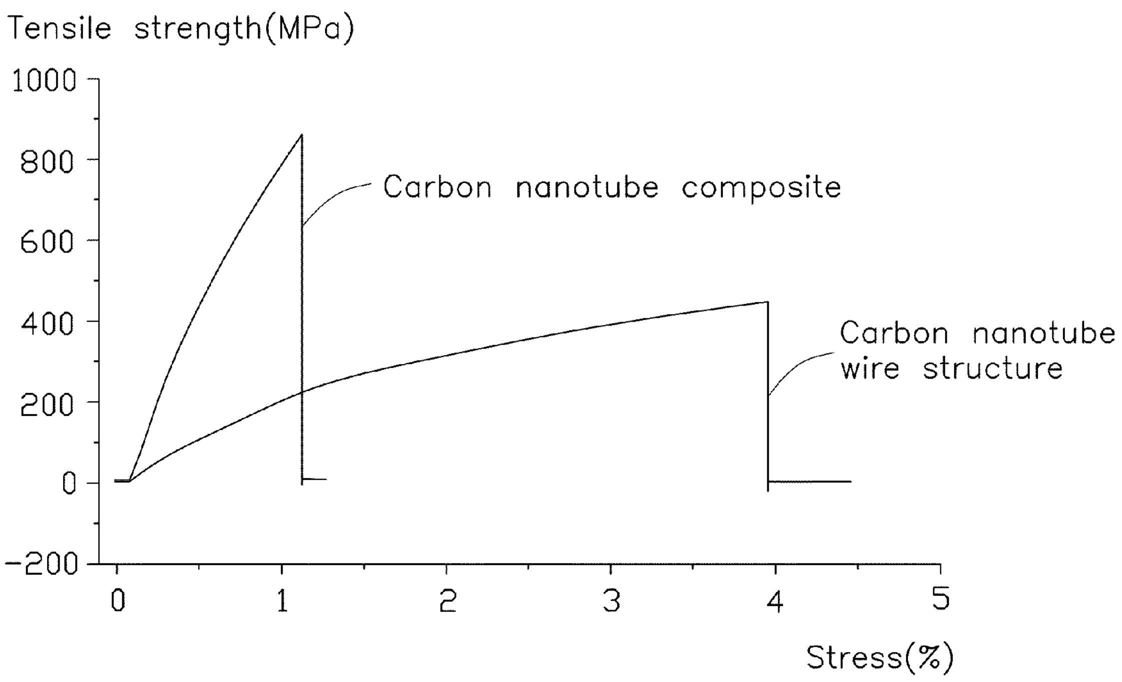
FIG. 18 shows a comparison of tensile strength between the carbon nanotube composite and a carbon nanotube wire structure.

Referring to FIG. 18, the linear shaped carbon nanotube composite has higher tensile strength and Young's modulus than the pure carbon nanotube wire structure. The diameter of the tested carbon nanotube wire structure is about 27 μm. The diameter of the tested linear shaped carbon nanotube composite is about 18 μm. The tensile strength of the tested carbon nanotube wire structure is about 447 MPa, and the Young's modulus of the tested carbon nanotube wire structure is about 10.5 GPa. The tensile strength of the tested linear shaped carbon nanotube composite 10 is about 862 MPa, and the Young's modulus of the tested linear shaped carbon nanotube composite 10 is about 123 GPa.

Method for Making Carbon Nanotube Composite

A method for making a carbon nanotube composite includes steps of:

(S11) providing a free-standing carbon nanotube structure and a reacting liquid;

(S12) treating the carbon nanotube structure by applying a reacting liquid on the carbon nanotube structure; and (S13) heating the treated carbon nanotube structure in an oxide-free environment.

The carbon nanotube structure includes the plurality of carbon nanotubes. The reacting liquid includes at least one kind of metal compound. The heating step causes a reaction in the metal compound (e.g., a decomposition of the metal compound).

More specifically, in step (S12), the reacting liquid can be applied to the carbon nanotube structure to soak the carbon nanotube structure. The reacting liquid can infiltrate into the micropores and/or clearances of the carbon nanotube structure.

The reacting liquid is achieved by dissolving a metal compound into a solvent. The metal compound is a pure chemical substance consisting of two or more different chemical elements, one of which is a metal. The metal compound can be an organic metal salt, non-organic metal salt, or metal complexes. The organic metal salt can include an organic group. The organic group has good affinity to the carbon nanotubes, thereby the organic metal salt combines well with the carbon nanotubes. The non-organic metal salt can be manganese nitrate, ferric nitrate, cobalt nitrate, nickel nitrate, copper nitrate, zinc nitrate, copper acetate, nickel acetate, cobalt acetate, zinc acetate, silver nitrate, platinum chloride, rhodium chloride, tin dichloride, tin tetrachloride, water-soluble ruthenium chloride, or palladium chloride. The metal complexes can include metal elements such as Pt, Au, Rh, Ru, or Pd. For example, the metal complexes can be chloroplatinic acid ($H_2PtCl_6.H_2O$), or chloroauric acid ($AuCl_3.HCl.4H_2O$).

The solvent can be water and/or organic solvent. The organic solvent has a greater affinity with the carbon nanotubes and can promote the infiltration of the reacting liquid into the carbon nanotube structure. Further, the organic solvent can densify the carbon nanotube structure. The carbon nanotubes in the carbon nanotube structure are combined by van der Waals attractive force forming an integral unit that is not in powder form. Therefore, just a solvent that can dissolve the metal compound and can be removed easily is needed. In one embodiment, the organic solvent is volatile, such as methanol, ethanol, propanol, ethylene glycol, glycerol, acetone, or tetrahydrofuran. In one embodiment, the metal compound can be completely dissolved in the solvent and exist in the solvent as a plurality of cations and anions.

In step (S12), the carbon nanotube structure can be disposed in the reacting liquid for a period of time, or the reacting liquid can be dropped onto the carbon nanotube structure.

The carbon nanotube structure includes a plurality of micropores and/or clearances. Therefore, the reacting liquid can infiltrate into the micropores and/or clearances of the carbon nanotube structure by capillarity. The reacting liquid can go in between adjacent carbon nanotubes even when the micropores and/or clearances are relatively small in size, for the reason of the liquidity of the reacting liquid without the use of an evaporation or sputter gas method to infiltrate the carbon nanotube structure with small micropores and/or clearances. The metal compound is dissolved in the solvent, and thus can infiltrate the carbon nanotube structure.

The carbon nanotube structure is taken out from the reacting liquid for the solvent to dry thereon. The reacting liquid previously used to soak the carbon nanotube structure can be used again. The carbon nanotube structure is an integral free-standing structure. Therefore, there is no need to disperse the carbon nanotubes in the reacting liquid.

In step (S13), by heating the carbon nanotube structure with the reacting liquid applied thereto, the solvent can be dried quickly, and the metal compound can decompose to form reinforcements on the carbon nanotubes of the carbon nanotube structure. The carbon nanotube is stable at high temperatures, and macroscopically the structure of the carbon nanotube structure will not be changed by the heating. Microscopically, some of the carbon atoms of the carbon nanotubes in the carbon nanotube structure may have a reaction with the metal compound.

The oxide-free environment can protect the carbon nanotubes in the carbon nanotube structure from being oxidized. The oxide-free environment can be a vacuum or an oxide-free gas atmosphere. The oxide-free gas can be nitrogen gas, inert gas, or reducing gas. The reducing gas can be hydrogen gas, carbon monoxide gas, and hydrogen sulfide gas. The heating temperature can be varied and predetermined according to the species of the metal compound. For example, the heating temperature can be equal to or higher than the decomposition temperature of the metal compound, which in many circumstances can be equal to or lower than about 450° C. The heating step can be processed by using for example, an oven, an electric current or laser radiation.

By using different metal compounds under different reacting conditions (e.g., different species of oxide-free gas and heating temperatures), different carbon nanotube composites with different metals or metal oxides formed on the surface of the carbon nanotubes of the carbon nanotube structure can be achieved. More specifically, when the metal compound is manganese nitrate, ferric nitrate, cobalt nitrate, nickel nitrate, copper nitrate, or zinc nitrate, by heating in vacuum, nitrogen gas, or inert gas, the metal compound will decompose into metal oxide on the surface of the carbon nanotubes of the carbon nanotube structure. However, when manganese nitrate, ferric nitrate, cobalt nitrate, nickel nitrate, copper nitrate, or zinc nitrate are heated in reducing gas, after being decomposed into the metal oxides, a reduction reaction will occur to make the metal oxides reduce to simple metals (i.e., pure metals). Therefore, by using reducing gas, the carbon nanotube composite with a plurality of nano sized simple metal grains (or layers of simple metal) located on the surface of the carbon nanotubes of the carbon nanotube structure can be achieved.

If the metal compound is copper acetate, nickel acetate, cobalt acetate, zinc acetate, silver nitrate, platinum chloride, rhodium chloride, tin dichloride, tin tetrachloride, water-soluble ruthenium chloride, palladium chloride, chloroplatinic acid, or chloroauric acid, by heating in vacuum, nitrogen gas, inert gas, or reducing gas, the metal compound will be directly decomposed into simple metal grains (or simple metal layers) on the surface of the carbon nanotubes of the carbon nanotube structure.

The simple metals or metal oxides can be grain shaped or form a layer, and the shape of the simple metals or metal oxides varies according to the concentration of the metal compound in the reacting liquid. The smaller the concentration of the metal compound in the reacting liquid, the greater the tendency for the simple metals or metal oxides to assume a grain shape. The greater the concentration of the metal compound in the reacting liquid, the greater the tendency for the simple metals or metal oxides to form a layer.

It is to be understood that when the reacting liquid has two or more kinds of metal compounds, the achieved carbon nanotube composite could have two or more kind of reinforcements formed on the outer surface of the carbon nanotubes of the carbon nanotube structure. For example, the carbon nanotube composite can have both the metal and metal oxide. For the reason that the reacting liquid evenly infiltrates the carbon nanotube structure and the reinforcements are produced in situ from the metal compound in the reacting liquid, the reinforcements can also be uniformly distributed in the carbon nanotube structure.

EXAMPLE 1

Referring to FIG. 9 and FIG. 10, a Pt-carbon nanotube composite film is produced by steps of:

(S101) providing a carbon nanotube structure 110;

(S102) soaking the carbon nanotube structure 110 in a chloroplatinic acid solution; and (S103) heating the soaked carbon nanotube structure 110 to about 300° C. in nitrogen gas in an oven.

In this example, the carbon nanotube structure 110 has six stacked carbon nanotube films. Carbon nanotubes in each film are aligned substantially perpendicular to the carbon nanotubes in adjacent films. The carbon nanotube structure 110 covers a metal ring. During soaking of the carbon nanotube structure 110, chloroplatinic acid infiltrates the micropores and/or clearances in the carbon nanotube structure 110. More specifically, the chloroplatinic acid solution is methanol with about 2% by mass of the chloroplatinic acid dissolved in it. In step (S102), the chloroplatinic acid solution can be dropped on the surface of the carbon nanotube structure 110. In step (S103), by heating the chloroplatinic acid solution soaked carbon nanotube structure 110 to about 300° C. in nitrogen gas, the chloroplatinic acid is reduced to Pt nano grain reinforcements 120 on the surface of the carbon nanotubes 112, to achieve the Pt-carbon nanotube composite film. The Pt nano grain reinforcements 120 can be joined to each other to form the Pt layers. To clearly show the Pt nano grain reinforcements 120, a photo of a single carbon nanotube 112 in the carbon nanotube structure 110 is shown in FIG. 10. The adjacent carbon nanotubes 112 can be joined together by the Pt nano grain reinforcements 120 located therebetween.

It can be understood that the Pt-carbon nanotube composite film can be cut or twisted to form a Pt-carbon nanotube composite wire structure.

EXAMPLE 2

Referring to FIG. 6 and FIG. 7, a $CO_3O_4$-carbon nanotube composite film is produced by steps of:

(S201) providing a carbon nanotube structure 110;

(S202) soaking the carbon nanotube structure 110 with a cobalt nitrate solution;

(S203) heating the soaked carbon nanotube structure 110 to about 300° C. in hydrogen gas in an oven.

In this example, the carbon nanotube structure 110 has twenty stacked carbon nanotube films. The carbon nanotubes of each carbon nanotube film are aligned substantially perpendicular to the carbon nanotubes in adjacent films. The carbon nanotube structure 110 covers a metal ring. By soaking the carbon nanotube structure 110, cobalt nitrate is infiltrated into the micropores and/or clearances of the carbon nanotube structure 110. More specifically, the cobalt nitrate solution is methanol with about 20% by mass of the $Co(NO_3)_2.6H_2O$ dissolved in it. In step (S202), the cobalt nitrate solution can be dropped on the surface of the carbon nanotube structure 110. In step (S203), the cobalt nitrate solution soaked carbon nanotube structure 110 is heated to about 300° C. in hydrogen gas, to decompose the cobalt nitrate to $CO_3O_4$ nano grain reinforcements 120 on the surface of the carbon nanotubes 112, to achieve the $CO_3O_4$-carbon nanotube composite film. To clearly show the $CO_3O_4$ nano grain reinforcements 120, a photo of a single carbon nanotube 112 in the carbon nanotube structure 110 is taken and shown in FIG. 7.

The adjacent carbon nanotubes 112 can be joined together by the $CO_3O_4$ nano grain reinforcements 120 located therebetween.

It can be understood that the $CO_3O_4$-carbon nanotube composite film can be cut or twisted to form a $CO_3O_4$-carbon nanotube composite wire structure.

EXAMPLE 3

Referring to FIG. 13, FIG. 16 and FIG. 17, a $Fe_2O_3$-carbon nanotube composite wire structure is produced by steps of:

(S301) providing a carbon nanotube structure 110;

(S302) soaking the carbon nanotube structure 110 by a ferric nitrate solution;

(S303) heating the soaked carbon nanotube structure 110 to about 300° C. with argon gas in an oven.

In this example the carbon nanotube structure 110 is a carbon nanotube twisted wire. By soaking the carbon nanotube structure 110, ferric nitrate is infiltrated into the micropores and/or clearances of the carbon nanotube structure 110. More specifically, the ferric nitrate solution is methanol with 20% by mass of the ferric nitrate in it. In step (S302), the carbon nanotube structure 110 can be disposed in the ferric nitrate solution and then taken out therefrom. In step (S303), the ferric nitrate solution soaked carbon nanotube structure 110 is heated to about 300° C. in argon gas, to decompose the ferric nitrate to $Fe_2O_3$ layer reinforcements 120 on the surface of the carbon nanotubes 112, to achieve the $Fe_2O_3$-carbon nanotube composite film. The adjacent carbon nanotubes 112 can be joined together by the $Fe_2O_3$ layer reinforcements 120 located therebetween.

It is to be understood that by using the method for making the carbon nanotube composite, the free-standing carbon nanotube structure is used, and the step of dispersing the carbon nanotubes in a solution can be avoided. The reinforcements are formed in situ on the carbon nanotubes of the carbon nanotube structure during the making of the carbon nanotube composite, and the achieved carbon nanotube composite inherits the structure of the carbon nanotube structure. The carbon nanotube structure is free-standing, and thus the achieved carbon nanotube composite structure is also free-standing.

If the carbon nanotube structure has a planar shape, such as the carbon nanotube film, a carbon nanotube composite film can be achieved. The carbon nanotube composite film can be twisted or cut into carbon nanotube composite wire. If the carbon nanotube structure has a linear shape, such as the carbon nanotube wire structure, a carbon nanotube composite wire can be achieved.

Electrochemical Capacitor

The above-described carbon nanotube composites can be used in many fields, such as lithium battery, solar cell, conducting wire for electric power and signals transmissions, clothing, antenna, and electrodes for polymeric touch panels, LED and OLED. An application of the carbon nanotube composite is the electrochemical capacitor.

Figure 19:
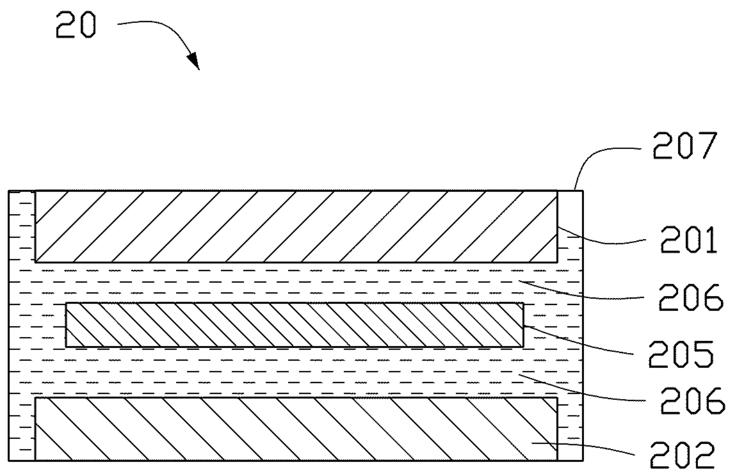
FIG. 19 is a schematic view of an embodiment of an electrochemical capacitor.

Referring to FIG. 19, a plate type electrochemical capacitor 20 includes a first electrode 201, a second electrode 202, a membrane 205, an electrolyte 206, and a container 207. The electrolyte 206 is filled in the container 207. The first electrode 201, the second electrode 202, and the membrane 205 are disposed in the electrolyte 206. The first electrode 201, the second electrode 202, and the membrane 205 are soaked in the electrolyte 206. The membrane 205 is located between the first electrode 201 and the second electrode 202, to separate the first electrode 201 from the second electrode 202.

The first electrode 201 is a carbon nanotube composite including a planar shaped carbon nanotube structure and reinforcing grains located on the carbon nanotubes of the carbon nanotube structure. The reinforcing grains can be nano sized. The second electrode 202 can be the same as the first electrode 201. By using the free-standing carbon nanotube composite as the first and second electrodes 201, 202, a current collector is unneeded. The free-standing carbon nanotube composite can be used as the current collector. The structure of the electrochemical capacitor 20 can be simplified. In other embodiments, the second electrode 202 can be made of other materials such as transition metal oxides and active carbon.

The carbon nanotube structure of carbon nanotube composite of the first and/or second electrodes 201, 202 is free-standing, and the carbon nanotubes thereof define a plurality of micropores/clearances. Further, when used as the first electrode 201 and/or second electrode 202, after the carbon nanotube structure is composited with the reinforcing grains, the achieved carbon nanotube composite should also define a plurality of micropores/clearances therein. The size of the micropores/clearances of the carbon nanotube composite can be equal to or smaller than about 10 μm. The micropores/clearances can be distributed uniformly in the carbon nanotube composite, and make up a large volume of the total volume of the carbon nanotube composite (e.g., the total volume of the micropores/clearances can be about 70% of the total volume of the carbon nanotube composite). The large amount of the micropores/clearances increases the specific surface area of the carbon nanotube composite. The contact area between the carbon nanotube composite and the electrolyte can be increased. Therefore, the charge/discharge speed of the electrochemical capacitor 20 can be improved, and the specific capacity of the electrochemical capacitor 20 can be enhanced.

The nano sized reinforcing grains cannot be dissolved by the electrolyte 206 or react with the electrolyte 206. More specifically, the reinforcing grains can be metal oxide grains, metal grains, or combinations thereof. The material of the metal oxide grains can be manganese dioxide ($MnO_2$), cobalt oxide ($CO_3O_4$), nickel oxide (NiO), ruthenium oxide ($RuO_2$), iridium oxide ($IrO_2$), or combinations thereof. The material of the metal grains can be copper, nickel, gold, silver, palladium, ruthenium, platinum, rhodium, or combinations thereof. The size of the reinforcing grains can be in a range from about 1 nm to about 100 nm. In one embodiment, the size of the reinforcing grains is in a range from 1 nm to 50 nm. The mass percentage of the reinforcing grains in the carbon nanotube composite can be in a range from about 50% to about 70%.

The nano sized reinforcing grains can promote the charge/discharge speed of the electrochemical capacitor 20, and enhance the specific capacity of the electrochemical capacitor 20.

Figure 20:
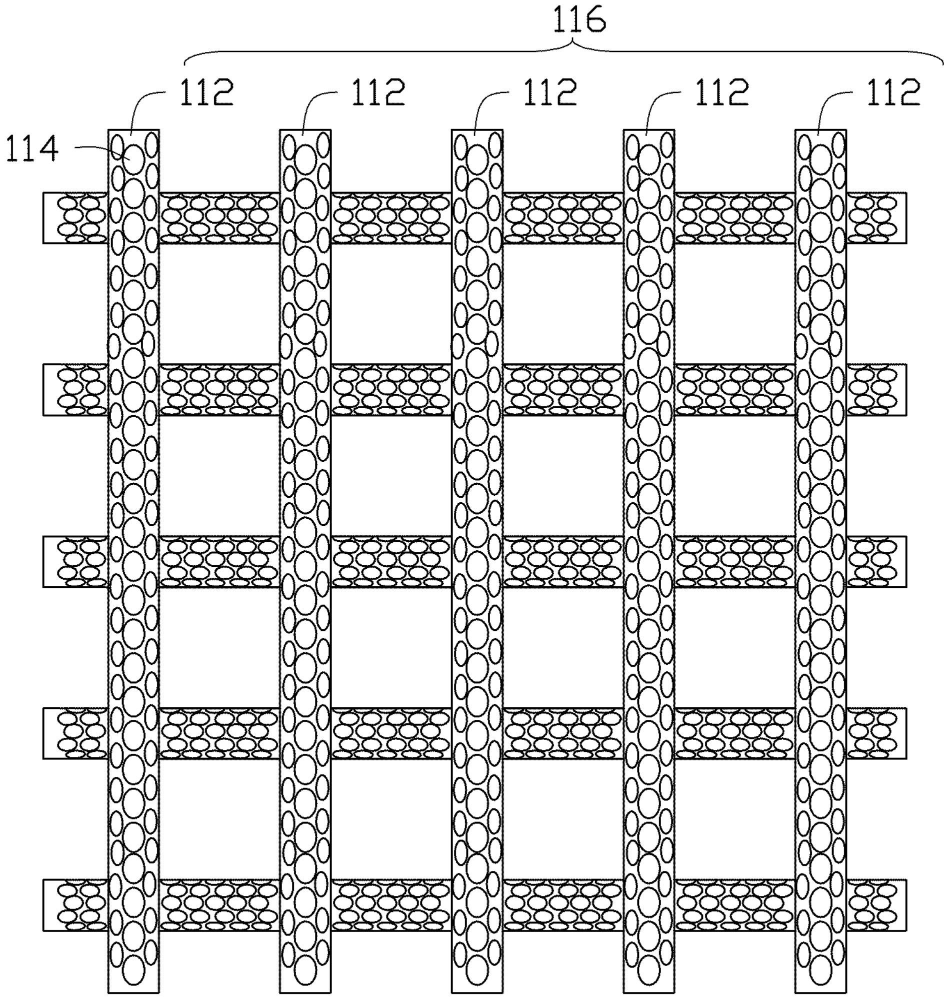
FIG. 20 is a schematic view of an embodiment of a carbon nanotube composite used in the electrochemical capacitor.
Figure 21:
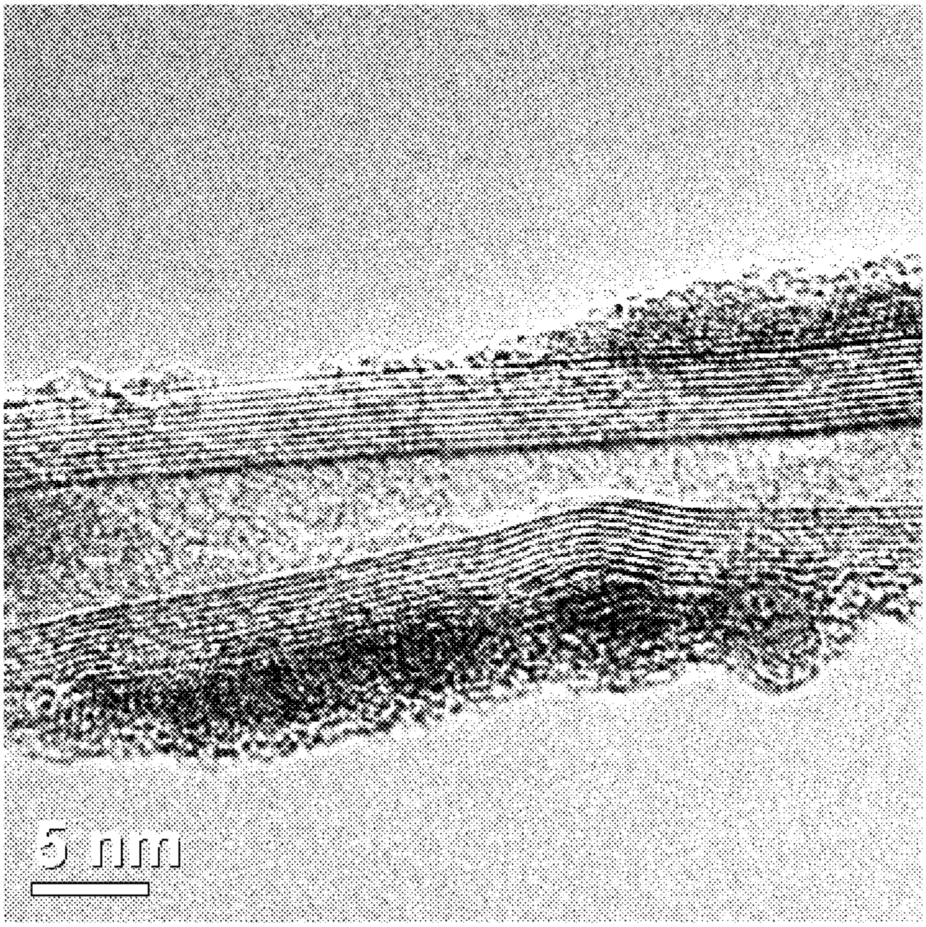
FIG. 21 shows a TEM image of one carbon nanotube with $MnO_2$ grains thereon.

Referring to FIG. 20, in one embodiment, the first electrode is the carbon nanotube composite 10, 12, 13, 14, 15 that includes twenty layers of the drawn carbon nanotube films 116 stacked with each other, and a plurality of nano sized metal oxide grains 114 located on the outer surfaces of the carbon nanotubes 112 in the drawn carbon nanotube films 116. The twenty layers of the drawn carbon nanotube films 116 are aligned so that each layer is substantially perpendicular to adjacent layers. However, an angle α can be defined by the carbon nanotubes 112 in some of the drawn carbon nanotube films 116 and the carbon nanotubes 112 in the other of the drawn carbon nanotube films 116. In this embodiment, the angle α is about 90°. For example, ten layers of the drawn carbon nanotube films 116 are aligned along a first direction, and the other ten layers of the drawn carbon nanotube films 116 are aligned along second direction. The first direction is substantially perpendicular to the second direction. In one embodiment, the angle α between adjacent two drawn carbon nanotube films 116 in the carbon nanotube composite 10 is about 90°. In one embodiment, the twenty layers of stacked drawn carbon nanotube films 116 has a total thickness of about 500 μm, a superficial density of about 27 micrograms/square centimeter ($\mu g/cm^2$), and a sheet resistance of about 50Ω.

The material of the membrane 205 can be glass fibers or polymer. The membrane 205 allows the ions in the electrolyte 206 to pass through and prevent the electrons to pass through, thereby electrically insulating the first electrode 201 from the second electrode 202.

The electrolyte 206 can be sodium hydroxide (NaOH) aqueous solution, potassium hydroxide (KOH) aqueous solution, sulfuric acid ($H_2SO_4$) aqueous solution, nitric acid ($HNO_3$) aqueous solution, sodium sulfate ($Na_2SO_4$) aqueous solution, potassium sulfate ($K_2SO_4$) aqueous solution, solution of lithium perchlorate ($LiClO_4$) in propylene carbonate (PC), solution of tetraethyl ammonium tetrafluoroborate in propylene carbonate, or combinations thereof. In one embodiment, the electrolyte 206 is 0.5 mol/L $Na_2SO_4$ aqueous solution.

The material of the shell 207 can be glass or stainless steel.

It is can be understood that the carbon nanotube composite can also be used in a coin type electrochemical capacitor or a coil type electrochemical capacitor.

EXAMPLE

Three different examples A, B and C of the plate type electrochemical capacitors 20 using three different carbon nanotube composites as the first electrode 201 and/or second electrode 202 are fabricated. The carbon nanotube composites of the three examples all adopt the same carbon nanotube structure including twenty layers of the drawn carbon nanotube films 116 stacked with each other. The angle α between any adjacent two drawn carbon nanotube films 116 in the carbon nanotube composite is about 90°. The only difference among the carbon nanotube composites of the three examples is the materials of the reinforcing grains.

Example A: the first and the second electrode 201, 202 are both the same $MnO_2$-carbon nanotube composite. Referring to FIG. 15, and FIG. 20, the nano sized metal oxide grains 114 is $MnO_2$ grains located on each of the carbon nanotubes 112 of the carbon nanotube composite. The mass percentage of the $MnO_2$ grains in the carbon nanotube composite is about 62%. The size of the $MnO_2$ grains can be about 5 nm. The electrolyte is about 0.5 mol/L $Na_2SO_4$ aqueous solution.

Example B: the first and the second electrode 201, 202 are both the same $CO_3O_4$-carbon nanotube composite. Referring to FIG. 7, the nano sized metal oxide grains 114 is $CO_3O_4$ grains located on each of the carbon nanotubes 112 of the carbon nanotube composite. The mass percentage of the $CO_3O_4$ grains in the carbon nanotube composite 10 is about 54%. The size of the $CO_3O_4$ grains can be about 10 nm. The electrolyte is about 1 mol/L KOH aqueous solution.

Example C: the first and the second electrodes 201, 202 are both the same NiO-carbon nanotube composite. The nano sized metal oxide grains 114 is NiO grains located on each of the carbon nanotubes 112 of the carbon nanotube composite. The mass percentage of the NiO grains in the carbon nanotube composite is about 51%. The electrolyte is about 1 mol/L KOH aqueous solution.

Figure 22:
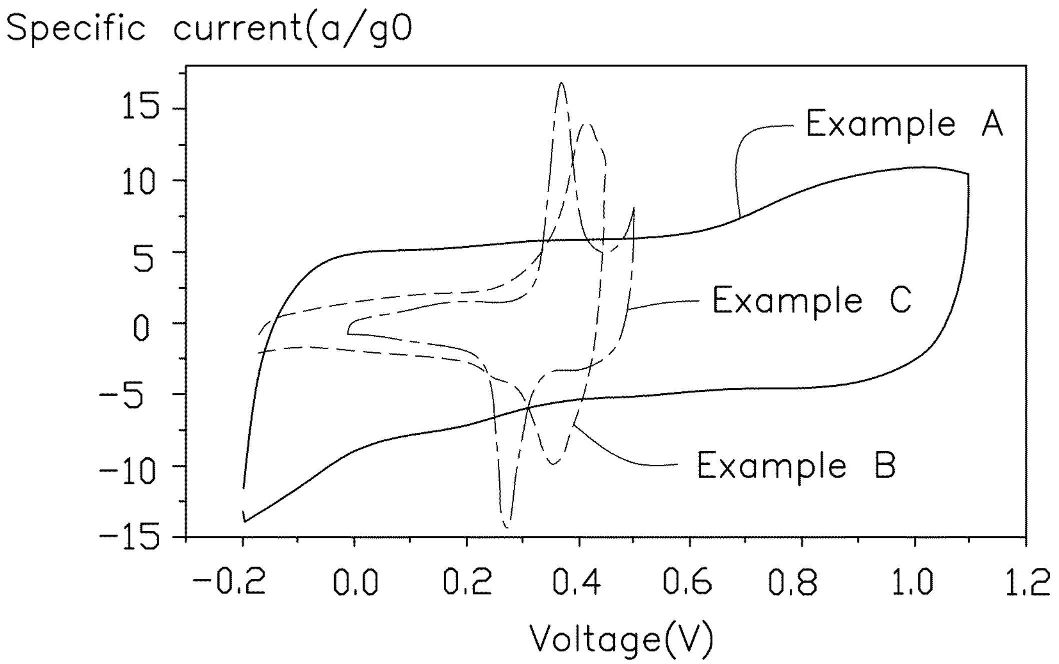
FIG. 22 is a voltage-specific current chart of examples A, B and C of the electrochemical capacitor under a scanning voltage of 10 micro-volts/second.
Figure 23:
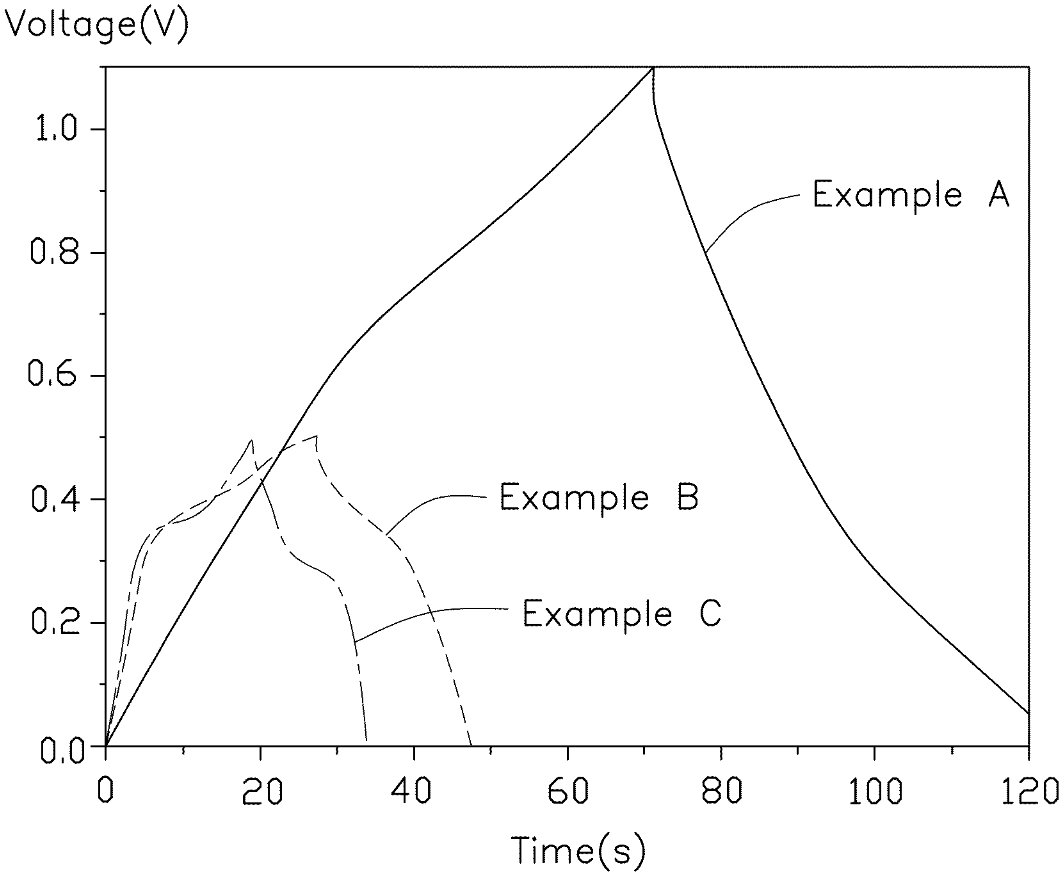
FIG. 23 is a charge/discharge chart of the examples A, B and C of the electrochemical capacitor under a specific current of 10 A/g.
Figure 24:
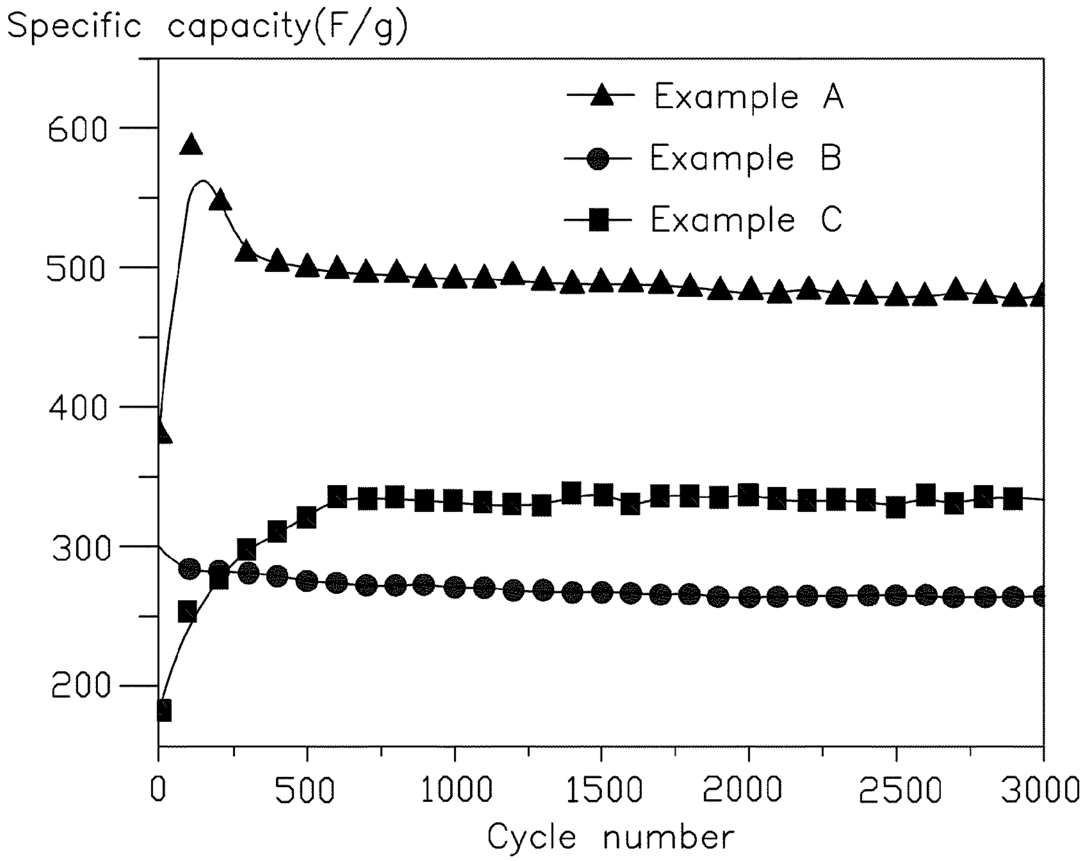
FIG. 24 is a cycle number-specific capacity charge of the examples A, B and C of the electrochemical capacitor under a specific current of 30 A/g.

Referring to FIGS. 22-24, the three different examples A, B and C of the plate type electrochemical capacitors 20 are tested. The testing results are shown in Table 1. The example A of the electrochemical capacitor 20 shows relatively higher charge/discharge efficiency and specific capacity, and better cycling capability among the three examples. The example A has an energy density of about 30 W·h/kg, and a power density of about 110 kW/kg. The instant specific capacity of the example B is larger than about 1100 F/g. The instant specific capacity of the example B is larger than about 1500 F/g. The examples A, B, and C all have good stability. The carbon nanotube composite has less weight than the conventional metal collector. Therefore, the electrochemical capacitor 20 specially using $MnO_2$-carbon nanotube composite has high energy density and power density.

TABLE 1

| | Example A | Example B | Example C |
|---|---|---|---|
| Time (seconds) for a cycle of charge and discharge under a current of 10 ampere per gram (A/g) | ≥120 | ≥45 | ≥30 |
| Gravimetric specific capacity (Faraday per gram, F/g) | 508 | 302 | 336 |
| Volumetric specific capacity (F/cm$^3$) | 800 | 470 | 530 |
| Specific capacity loss after 2500 times of cycling to the initial specific capacity | ≤4.5% | ≤4.5% | ≤4.5% |

It is to be understood that the above-described embodiments are intended to illustrate rather than limit the present disclosure. Variations may be made to the embodiments without departing from the spirit of the disclosure as claimed. Any elements discussed with any embodiment are envisioned to be able to be used with the other embodiments. The above-described embodiments illustrate the scope of the disclosure but do not restrict the scope of the disclosure.

What is claimed is:

1. An electrochemical capacitor comprising:

a first electrochemical capacitor electrode comprising a carbon nanotube composite comprising a free-standing carbon nanotube structure and a plurality of nano grains located on the free-standing carbon nanotube structure;

a second electrochemical capacitor electrode;

a membrane located between the first electrode and the second electrode, to separate the first electrode from the second electrode; and an electrolyte, wherein the first electrochemical capacitor electrode, the second electrochemical capacitor electrode, and the membrane are disposed in the electrolyte.

2. The electrochemical capacitor of claim 1, wherein the free-standing carbon nanotube structure comprises a plurality of carbon nanotubes, the plurality of nano grains being located on the plurality of carbon nanotubes.

3. The electrochemical capacitor of claim 2, wherein the plurality of carbon nanotubes define a plurality of clearances in the free-standing carbon nanotube structure.

4. The electrochemical capacitor of claim 1, wherein the plurality of nano grains are selected from the group consisting of metal oxide grains, metal grains, and combinations thereof.

5. The electrochemical capacitor of claim 4, wherein a material of the metal oxide grains is selected from the group consisting of manganese dioxide, cobalt oxide, nickel oxide, ruthenium oxide, iridium oxide, and combinations thereof.

6. The electrochemical capacitor of claim 4, wherein a material of the metal grains is selected from the group consisting of copper, nickel, gold, silver, palladium, ruthenium, platinum, rhodium, and combinations thereof.

7. The electrochemical capacitor of claim 1, wherein the free-standing carbon nanotube structure comprises at least one carbon nanotube film.

8. The electrochemical capacitor of claim 7, wherein the at least one carbon nanotube film comprises a plurality carbon nanotubes entangled with each other.

9. The electrochemical capacitor of claim 7, wherein the at least one carbon nanotube film comprises a pressed carbon nanotube array.

10. The electrochemical capacitor of claim 7, wherein the at least one carbon nanotube film comprises a plurality of successively oriented carbon nanotube segments joined end-to-end by van der Waals attractive force therebetween.

11. The electrochemical capacitor of claim 7, wherein the at least one carbon nanotube film comprises a plurality of carbon nanotube films stacked with each other.

12. The electrochemical capacitor of claim 1, wherein the free-standing carbon nanotube structure comprises at least one carbon nanotube wire structure.

13. The electrochemical capacitor of claim 1, wherein the second electrochemical capacitor electrode comprises a carbon nanotube composite the same as that of the first electrode.

14. An electrochemical capacitor comprising:

a first electrochemical capacitor electrode;

a second electrochemical capacitor electrode;

a membrane located between the first electrochemical capacitor electrode and the second electrochemical capacitor electrode, to separate the first electrochemical capacitor electrode from the second electrochemical capacitor electrode; and an electrolyte to soak the first electrochemical capacitor electrode, the second electrochemical capacitor electrode, and the membrane;

wherein the first electrochemical capacitor electrode is a carbon nanotube composite film comprising at least one carbon nanotube film, and a plurality of nano grains, the at least one carbon nanotube film is also a current collector, the plurality of nano grains being located on and in contact with the plurality of carbon nanotubes.

15. The electrochemical capacitor of claim 14, wherein the plurality of nano grains is $MnO_2$ grains, NiO grains, or $Co_3O_4$ grains.

16. The electrochemical capacitor of claim 14, wherein the at least one carbon nanotube film is a free-standing film comprising a plurality of carbon nanotubes joined end to end by van der Waals attractive force therebetween.

17. An electrochemical capacitor comprising:

a carbon nanotube composite, used as a first electrochemical capacitor electrode and a current collector, comprising a free-standing carbon nanotube structure and a plurality of nano grains located on the free-standing carbon nanotube structure, the plurality of nano grains is $MnO_2$ grains, NiO grains, or $Co_3O_4$ grains;

a second electrochemical capacitor electrode;

a membrane located between the carbon nanotube composite and the second electrochemical capacitor electrode, to separate the carbon nanotube composite from the second electrochemical capacitor electrode; and an electrolyte, wherein the carbon nanotube composite, the second electrochemical capacitor electrode, and the membrane are disposed in the electrolyte.

* * * * *